United States Patent
Hiraishi

(10) Patent No.: US 11,461,044 B2
(45) Date of Patent: Oct. 4, 2022

(54) NONVOLATILE MEMORY DEVICE CONTROLLING PARTICAL USAGE RESTRICTION FOR MEMORY CELL ARRAY

(71) Applicant: Kioxia Corporation, Tokyo (JP)

(72) Inventor: Tomoya Hiraishi, Yokohama (JP)

(73) Assignee: Kioxia Corporation, Tokyo (JP)

( * ) Notice: Subject to any disclaimer, the term of this patent is extended or adjusted under 35 U.S.C. 154(b) by 92 days.

(21) Appl. No.: 16/126,134

(22) Filed: Sep. 10, 2018

(65) Prior Publication Data

US 2019/0294368 A1    Sep. 26, 2019

(30) Foreign Application Priority Data

Mar. 22, 2018   (JP) .............................. JP2018-053943

(51) Int. Cl.
*G06F 3/06* (2006.01)
*G01K 1/14* (2021.01)

(52) U.S. Cl.
CPC .......... *G06F 3/0659* (2013.01); *G06F 3/0619* (2013.01); *G06F 3/0679* (2013.01); *G01K 1/14* (2013.01)

(58) Field of Classification Search
CPC ..... G06F 3/0659; G06F 3/0619; G06F 3/0679
See application file for complete search history.

(56) References Cited

U.S. PATENT DOCUMENTS

| | | | |
|---|---|---|---|
| 7,441,068 B2 | 10/2008 | Pua et al. | |
| 7,839,684 B2 | 11/2010 | Kao et al. | |
| 8,380,942 B1* | 2/2013 | Corddry | G06F 12/0246 711/154 |
| 9,218,881 B2* | 12/2015 | Yang | H01L 27/11524 |
| 9,886,405 B1* | 2/2018 | Johnson | G06F 13/387 |
| 2011/0055468 A1* | 3/2011 | Gonzalez | G06F 11/106 711/103 |
| 2011/0161678 A1* | 6/2011 | Niwa | G06F 21/73 713/193 |
| 2015/0134895 A1 | 5/2015 | Sohn et al. | |

(Continued)

FOREIGN PATENT DOCUMENTS

| | | |
|---|---|---|
| JP | 2014-167842 A | 9/2014 |
| JP | 5731622 | 6/2015 |
| JP | 2016-62619 | 4/2016 |

*Primary Examiner* — Masud K Khan
*Assistant Examiner* — Dustin B. Fulford
(74) *Attorney, Agent, or Firm* — Oblon, McClelland, Maier & Neustadt, L.L.P.

(57) ABSTRACT

According to one embodiment, a nonvolatile memory device includes a memory cell array, first and second storage units, and control unit. The memory cell array includes erase unit areas. The first storage units correspond respectively to the erase unit areas and store items of first information indicating whether a first usage restriction is to be imposed on the corresponding erase unit areas. The second storage units correspond respectively to the erase unit areas and store items of second information indicating whether a second usage restriction is to be imposed on the corresponding erase unit areas. The control unit executes switching control on whether the first usage restriction is to be imposed or not and whether the second usage restriction is to be imposed or not on the memory cell array based on the first and second information.

12 Claims, 13 Drawing Sheets

(56) References Cited

U.S. PATENT DOCUMENTS

2016/0078948 A1    3/2016  Shirakawa
2017/0109099 A1*  4/2017  Iwaki .................. G06F 11/1666
2018/0189154 A1*  7/2018  Zhu ..................... G06F 11/0727

* cited by examiner

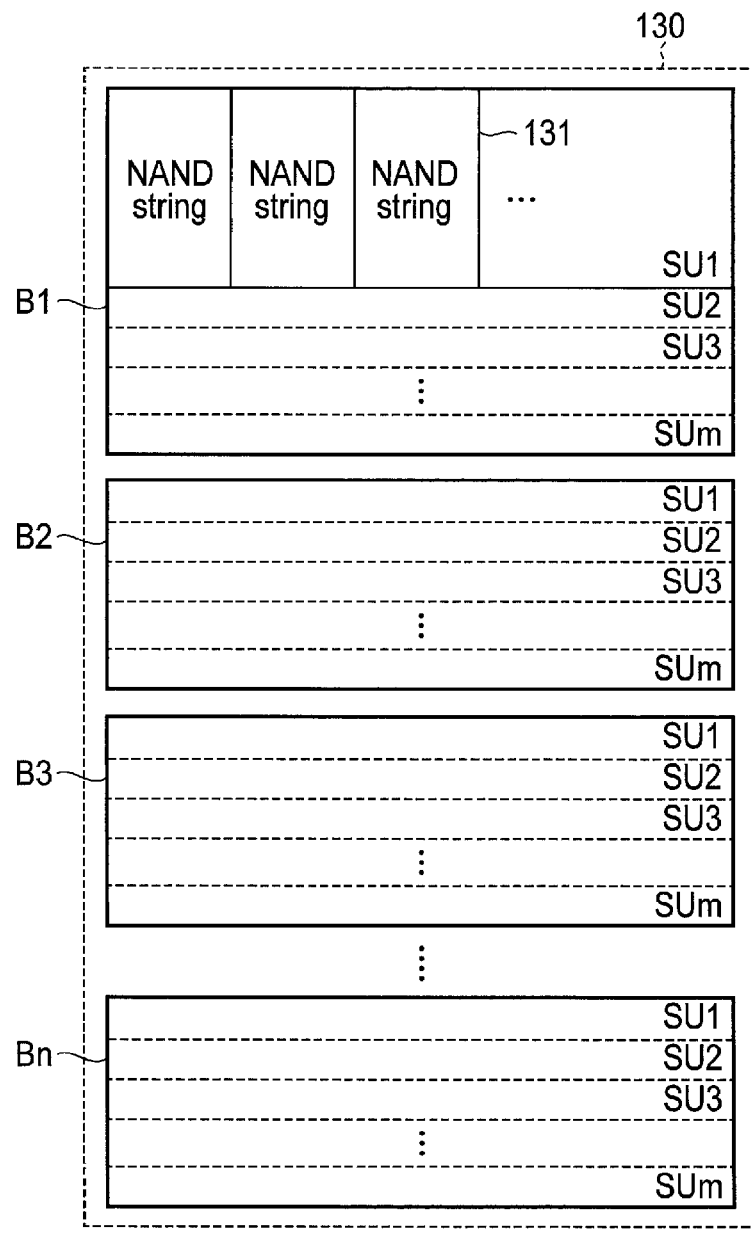
F I G. 2

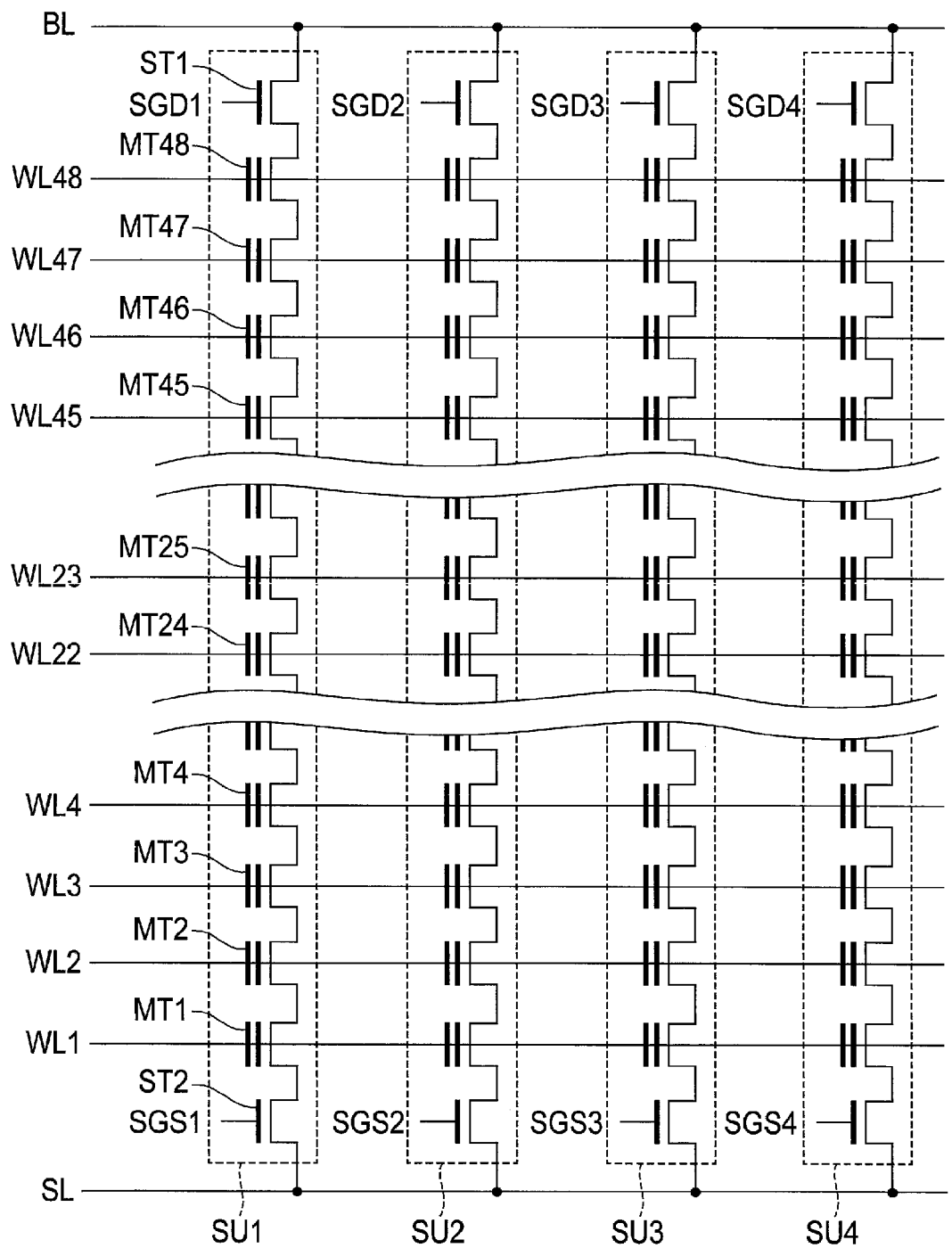
F I G. 3

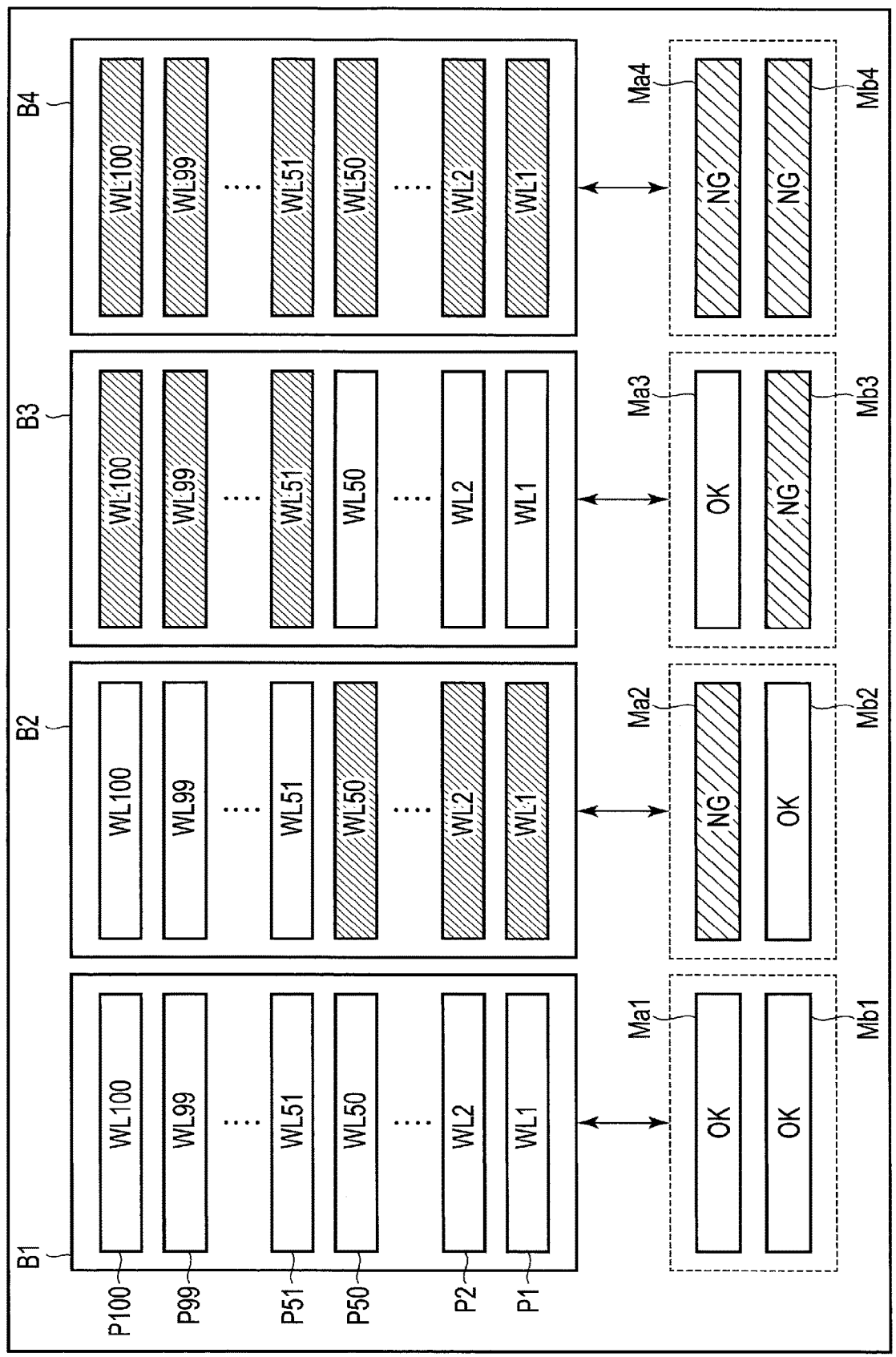
F I G. 5

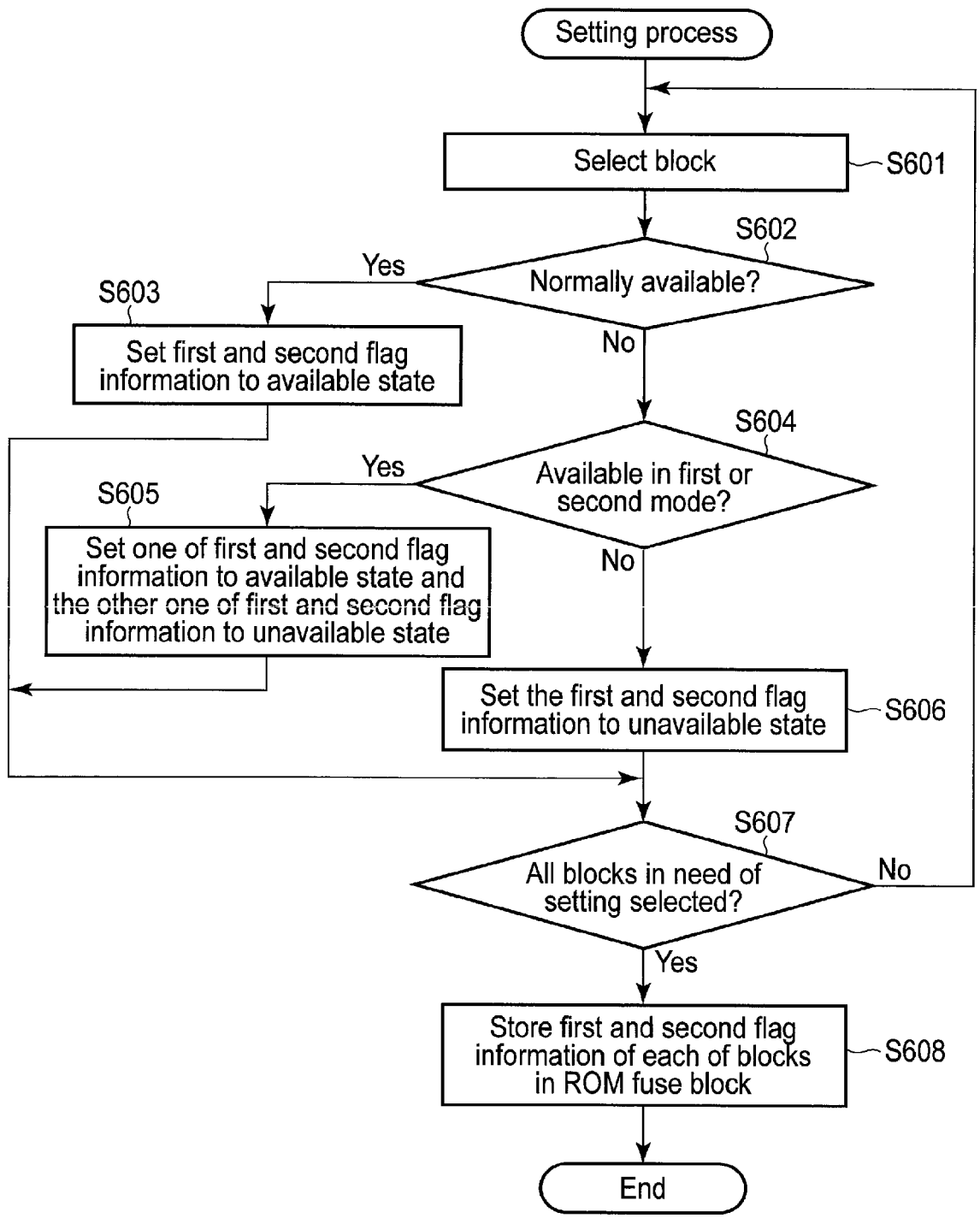
F I G. 6

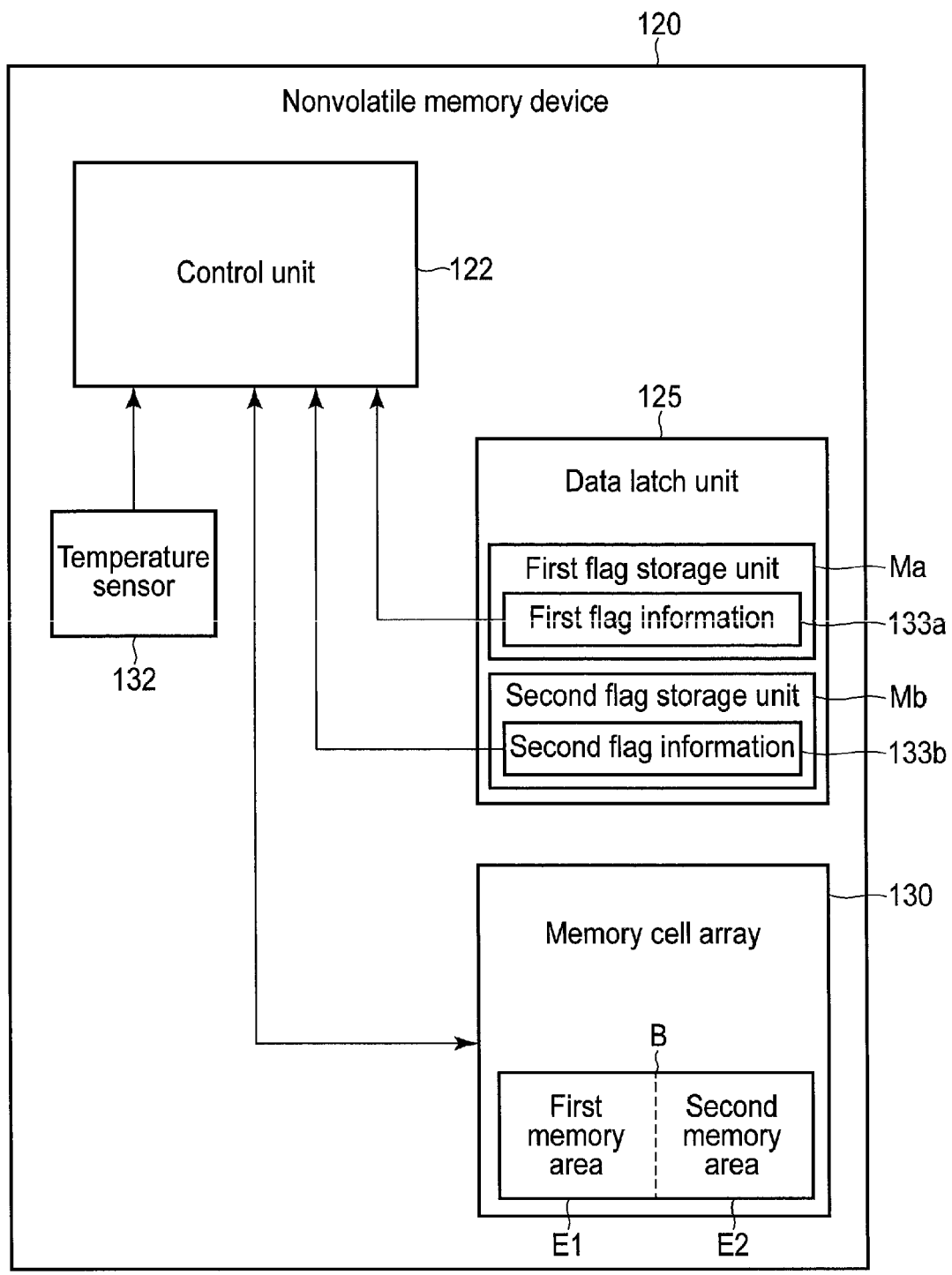
F I G. 13

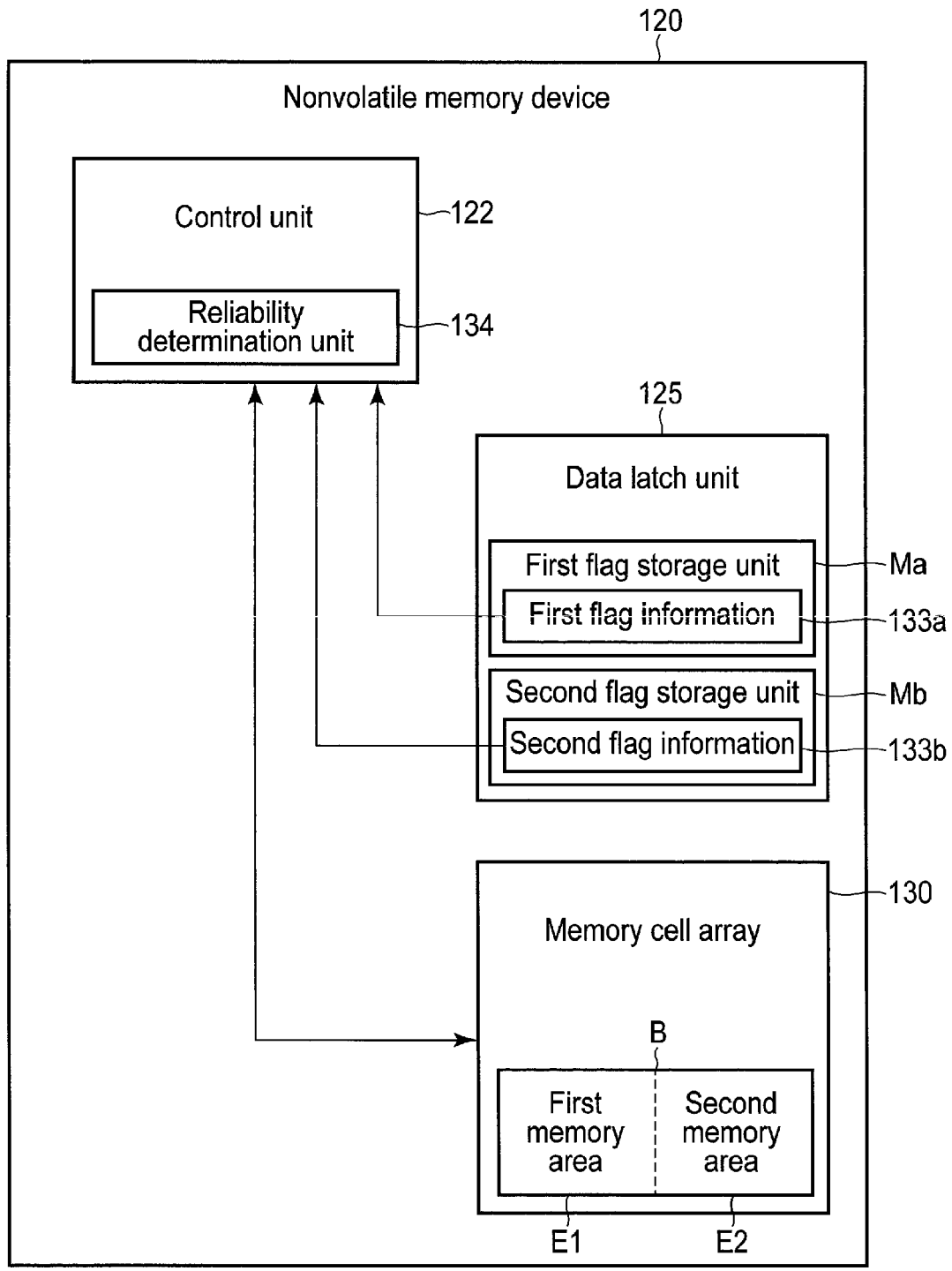
F I G. 14

NONVOLATILE MEMORY DEVICE CONTROLLING PARTICAL USAGE RESTRICTION FOR MEMORY CELL ARRAY

CROSS-REFERENCE TO RELATED APPLICATIONS

This application is based upon and claims the benefit of priority from Japanese Patent Application No. 2018-053943, filed Mar. 22, 2018, the entire contents of which are incorporated herein by reference.

FIELD

Embodiments described herein relate generally to a nonvolatile memory device and a control method.

BACKGROUND

Recently, memory systems including nonvolatile memory devices such as NAND flash memories are widely used as storage devices of various electronic devices.

If an error is detected in a part of memory areas of a nonvolatile memory device, a setting is made to disable the memory area in which the error is detected.

BRIEF DESCRIPTION OF THE DRAWINGS

FIG. 2 is a block diagram showing an example of the configuration of a memory cell array.

FIG. 3 is a circuit diagram showing an example of the configuration of the memory cell array.

FIG. 5 is a block diagram showing an example of the relationship of blocks to first and second flag storage units corresponding to the blocks according to the first embodiment.

FIG. 6 is a flowchart showing an example of a process of setting first and second flag information to the blocks according to the first embodiment.

FIG. 13 is a block diagram showing an example of a nonvolatile memory device which determines whether a plurality of memory areas included in the block are to be disabled or not based on temperature.

FIG. 14 is a block diagram showing an example of a nonvolatile memory device which determines whether a plurality of memory areas included in the block are to be disabled or not based on reliability.

DETAILED DESCRIPTION

Embodiments will be described hereinafter with reference to the accompanying drawings. In the following description, constituent elements having substantially the same function and configuration will be denoted by the same reference number, and description will be repeated only when necessary. Further, the following embodiments illustrate a device and a method which give concrete forms to technical ideas, and the technical ideas of the embodiments are not intended to limit materials, shapes, structures, arrangements, etc., of components to those described below. The technical ideas of the embodiments can be modified in various manners in the scope of patent claims.

In general, according to one embodiment, a nonvolatile memory device includes a memory cell array, a plurality of first storage units, a plurality of second storage units, and a control unit. The memory cell array includes a plurality of erase unit areas each of which includes a plurality of read unit areas. The plurality of first storage units correspond respectively to the erase unit areas and store a plurality of items of first information indicating whether a first usage restriction is to be imposed on the corresponding erase unit areas. The plurality of second storage units correspond respectively to the erase unit areas and store a plurality of items of second information indicating whether a second usage restriction is to be imposed on the corresponding erase unit areas. The control unit executes switching control on whether the first usage restriction is to be imposed or not and whether the second usage restriction is to be imposed or not on the memory cell array based on the first information and the second information.

According to the present embodiments, for example, a nonvolatile memory device and a control method which can reduce memory areas to be disabled can be provided.

In the following embodiments, a memory system including a nonvolatile memory device will be described by way of example. The nonvolatile memory device may be, for example, a NAND flash memory, in particular, a three-dimensional stacked NAND flash memory or may be, for example, another nonvolatile semiconductor memory such as a NOR flash memory, a magnetoresistive random access memory (MRAM), a phase change random access memory (PRAM), a resistive random access memory (ReRAM) or a ferroelectric random access memory (FeRAM). Alternatively, the nonvolatile memory device may be, for example, a magnetic memory device, etc.

First Embodiment

In the first embodiment, a nonvolatile memory device and a control method which maintains the use of a memory area, for example, even if an error is detected in the memory area, while restricting the performance of the memory area (for example, the function or the memory area to be used) in which the error is detected will be described.

Figure 1:
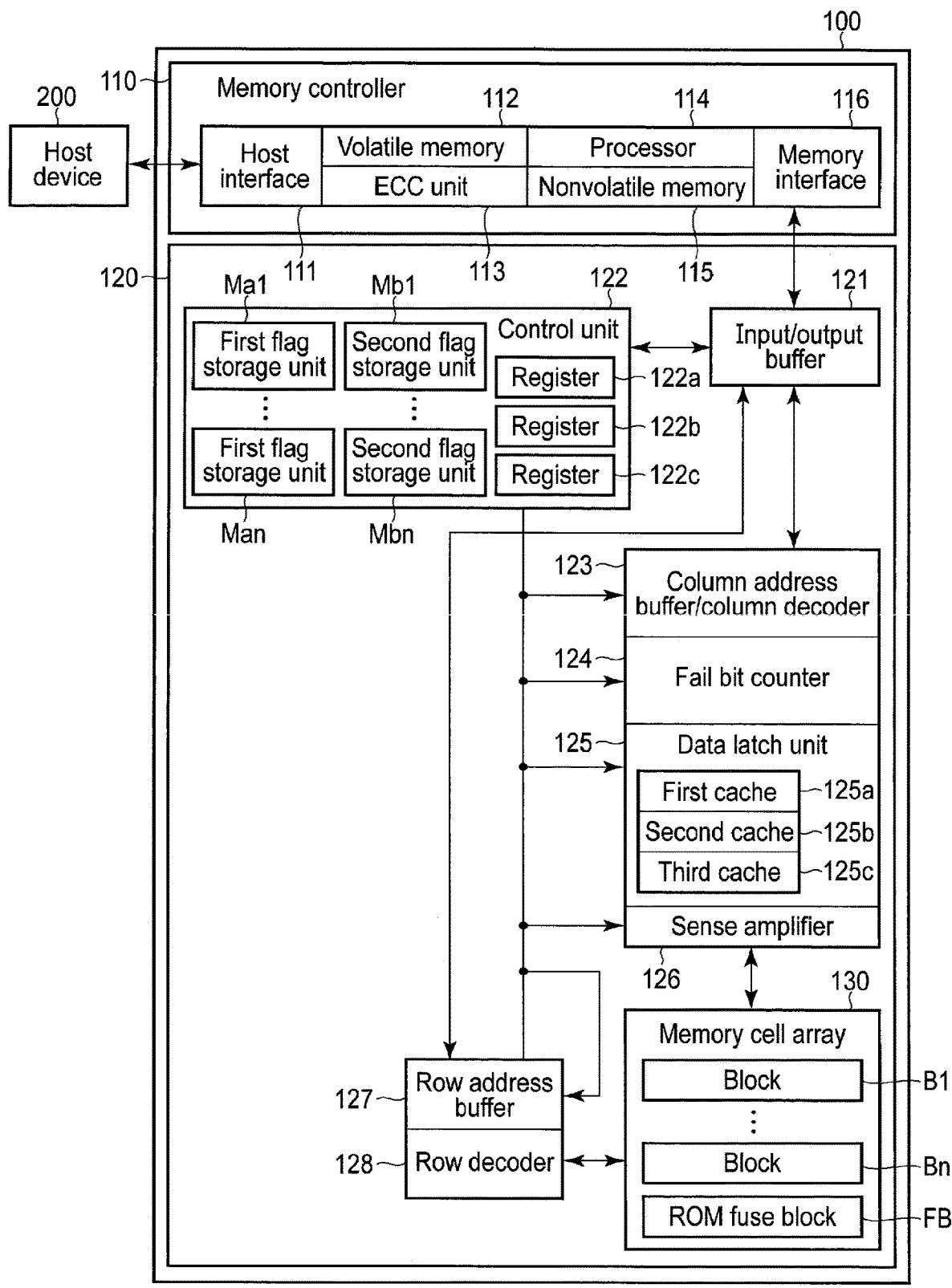
FIG. 1 is a block diagram showing an example of the configuration of a memory system according to the first embodiment.

FIG. 1 is a block diagram showing an example of the configuration of a memory system 100 according to the first embodiment.

The memory system 100 includes a memory controller 110 and a nonvolatile memory device 120. The memory system 100 may include a host device 200.

The memory controller 110 includes a host interface 111, a volatile memory 112 such as a random access memory (RAM), an error correcting code (ECC) unit 113, a processor 114, a nonvolatile memory 115 and a memory interface 116. The processor 114 may be, for example, a central processing unit (CPU), a microprocessor unit (MPU), etc. The nonvolatile memory 115 may be, for example, a read only memory (ROM), etc.

The memory controller 110 outputs, to the nonvolatile memory device 120, a command, etc., necessary for an operation of the nonvolatile memory device 120. As the memory controller 110 outputs the command to the nonvolatile memory device 120, the memory controller 110 reads data from the nonvolatile memory device 120, writes data to the nonvolatile memory device 120 or erases data from the nonvolatile memory device 120, etc. A write operation includes a plurality of loops, and one loop includes a program operation and a program verify operation.

The host interface 111 is connected to the host device 200 such that the host interface 111 can communicate with the host device 200. Data transmission and reception, etc., are performed between the host device 200 and the memory system 100 via the host interface 111. The host device 200 may be, for example, an information processing device such as a personal computer or a server.

The volatile memory 112 stores, for example, an operation program for an operation of the processor 114, etc.

When receiving data from the host device 200, the ECC unit 113 adds an error correcting code to the received data. The ECC unit 113 then supplies the data with the error correcting code to, for example, the memory interface 116. Further, the ECC unit 113 receives data supplied from the nonvolatile memory device 120 via the memory interface 116. The ECC unit 113 then makes an error correction to the data received from the nonvolatile memory device 120 using the error correction code. Subsequently, the ECC unit 13 supplies the data subjected to error correction to the host interface 111.

The ECC unit 113 may be structured as an electronic circuit, and for example, as the processor 114 executes an error correction program, the function of the ECC unit 113 may be realized.

The processor 114 controls an entire operation of the memory system 100. More specifically, the processor 114 controls the nonvolatile memory device 120 based on data stored in the volatile memory 112 and the nonvolatile memory 115. Also in a case where the host device 200 is included in the memory system 100 as described above, the processor 114 may control the entire operation of the memory system 100.

The nonvolatile memory 115 stores, for example, an operation program for an operation of the processor 114, etc.

The memory interface 116 is connected to the nonvolatile memory device 120 via a data bus.

The nonvolatile memory device 120 includes an input/output buffer 121, a control unit 122, a column address buffer/column decoder 123, a fail bit counter 124, a data latch unit 125, a sense amplifier 126, a row address buffer 127, a row decoder 128 and a memory cell array 130. These constituent elements of the nonvolatile memory device 120 may be composed of electronic circuits.

The memory cell array 130 is a three-dimensional nonvolatile semiconductor memory in which a plurality of nonvolatile memory cell transistors are stacked in a direction perpendicular to a semiconductor substrate. If the memory cell array 130 is a NAND flash memory, the memory cell array 130 includes a plurality of blocks B1 to Bn. Each of the blocks B1 to Bn includes a plurality of pages. A data erase operation is executed on the memory cell array 130 on a block-by-block basis. A data write/read (access) operation is executed on the memory cell array 130 on a page-by-page basis. The write/read operation, that is, the access operation means either a data read operation or a data write operation or both a data read operation and a data write operation. The detailed configuration of the memory cell array 130 will be described later. If the blocks B1 to Bn are not differentiated from each other, the blocks B1 to Bn will be hereinafter referred to as blocks B.

The memory cell array 130 may include a read only memory (ROM) fuse block FB. The ROM fuse block FB may be divided into the number of blocks (n) and may be provided respectively for the blocks B1 to Bn. The ROM fuse block FB holds a plurality of items of flag information respectively for the blocks B1 to Bn. The flag information is setting information on writing of data to the memory cell array 103 and reading of data written to the memory cell array 130, and may be binary information or multi-valued information.

The sense amplifier 126 senses data which is read out from a memory cell transistor to a bit line at a SEN node (not shown) when a data read operation is executed. Further, the sense amplifier 126 sets a program voltage according to program data to the SEN node of the sense amplifier when a data write operation is executed. Data is read from and written to the memory cell array 130 by a plurality of memory cell transistors per operation (on a page-by-page basis as will be described later). The sense amplifier 126 receives a bit line select signal from the column address buffer/column decoder 123, and selects and drives any of bit lines via a bit line select transistor (not shown).

A write operation includes a program voltage application operation (which is also referred to as a program operation, etc.) which increases a threshold value by injecting electric charges into a charge storage layer of a memory cell transistor, and a program verify operation which verifies a change in the distribution of threshold values as a result of the program voltage application operation.

The data latch unit 125 includes a first cache 125a, a second cache 125b and a third cache 125c which are composed of static RAMs (SRAMs), etc. Each of the first cache 125a, the second cache 125b and the third cache 125c stores data supplied from the main controller 110, a result of verification detected by the sense amplifier 126, etc. Further, each of the first cache 125a, the second cache 125b and the third cache 125c holds data for one page. The page will be defined later.

The fail bit counter 124 counts the number of bits in which a program operation is not completed based on the results of verification stored in the data latch unit 125.

The column address buffer/column decoder 123 temporarily stores a column address signal which is input from the memory controller 110 via the input/output buffer 121. Further, the column address buffer/column decoder 123 outputs, to the sense amplifier 126, a select signal which selects any of bit lines BL according to the column address signal.

The row decoder 128 decodes a row address signal which is input via the row address buffer 127, and selects and drives a word line WL and select gate lines SGD and SGS of the memory cell array. Further, the row decoder 128 includes a part which selects a block B of the memory cell array 130 and a part which selects a page of the memory cell array 130.

The nonvolatile memory device 120 of the first embodiment includes an external input/output terminal I/O which is not shown in the drawing, and transfers data between the input/output buffer 121 and the memory controller 110 via the external input/output terminal I/O. An address signal which is input via the external input/output terminal I/O is output to the row decoder 128 and the column address buffer/column decoder 123 via the row address buffer 127.

The control unit 122 executes sequential control on a data program operation and a data erase operation and control on a read operation based on various external control signals (such as a chip enable signal CEn, a write enable signal WEn, a read enable signal REn, a command latch enable signal CLE and an address latch enable signal ALE) supplied via the memory controller 110 and a command CMD.

Further, the control unit 122 includes registers 122a, 122b and 122c and stores values necessary for the computation in the control unit 122 such as a value related to flag data and a value related to a value counted by the fail bit counter 124.

The register 122a stores a predetermined value NCHK_PV, etc., and the register 122b stores a predetermined value NML2V_PV, etc. Further, the register 122c stores a sample string or information (for example, 8-bit information) which is read from a lower page, etc.

The control unit 122 determines an initial program voltage used for a program operation based on flag data stored in the register 122c.

Further, the control unit 122 compares the number of bits in which a program operation is not completed with the set number of tolerable fail bits, and determines whether a program operation is passed or failed. Still further, the control unit 122 includes an internal loop counter which counts the number of program pulse applications.

In the first embodiment, the control unit 112 further includes first flag storage units Ma1 to Man corresponding respectively to the blocks B1 to Bn and second flag storage units Mb1 to Mbn corresponding respectively to the blocks B1 to Bn. For the sake of simplicity, FIG. 1 only shows the first flag storage unit Ma1 and the second flag storage unit Mb1 corresponding to the block B1, and the first flag storage unit Man and the second flag storage unit Mbn corresponding to the block Bn. If the first flag storage units Ma1 to Man are not differentiated from each other, the first flag storage units Ma1 to Man will be hereinafter referred to as the first flag storage units Ma. If the second flag storage units Mb1 to Mbn are not differentiated from each other, the second flag storage units Mb1 to Mbn will be hereinafter referred to as the second flag storage units Mb.

The first embodiment will be described based on the assumption that the first and second, that is, two flag storage units Ma and Mb are allocated to one block B. However, three or more flag storage units may be allocated to one block B. The first flag storage units Ma1 to Man and the second flag storage units Mb1 to Mbn may be, for example, latch circuits.

The first flag storage unit Ma1 and the second flag storage unit Mb1 correspond to the block B1 of the memory cell array 130.

The first flag storage unit Ma2 and the second flag storage unit Mb2 correspond to the block B2 of the memory cell array 130.

Similarly, the first flag storage unit Ma3 and the second flag storage unit Mb3 correspond to the block B3, and the subsequent first flag storage units Ma and the subsequent flag storage units Mb correspond to the subsequent blocks B, respectively.

First flag information stored in the first flag storage unit Ma indicates whether a first usage restriction is to be imposed on the corresponding block B or not.

Second flag information stored in the second flag storage unit Mb indicates whether a second usage restriction is to be imposed on the corresponding block B or not.

The usage restriction on the block B means such control that the memory capacity of each of the blocks B in the memory cell array 130 becomes less than the memory capacity thereof in the normal operation, for example, by prohibiting the use of a memory cell transistor which causes an error or prohibiting the use of a part of values expressed in a memory cell transistor which causes an error. The first embodiment aims to continuously use the block B within a predetermined reliability range by imposing a usage restriction on the block B. As the first example of the usage restriction, one part of groups of memory cell transistors included in the block B is enabled and the other part of the groups is disabled as is the case with the first embodiment and the fourth and fifth embodiments which will be described later. As the second example of the usage restriction, one part of values expressed respectively in the memory cell transistors included in the block B is enabled and the other part of the values is disabled as is the case with the second and third embodiments.

The first flag information stored in each of the first flag storage units Ma1 to Man and the second flag information stored in each of the second flag storage units Mb1 to Mbn are stored, for example, in the ROM fuse block FB of the memory cell array 130.

The plurality of items of first flag information and the plurality of items of second flag information in the ROM fuse block FB may be stored, for example, at the time of a product inspection before the shipping of the memory system 100.

The control unit 122 stores the items of first flag information which are read from the ROM fuse block FB respectively in the corresponding first flag storage units Ma1 to Man at the time of activation of the memory system 100. Similarly, the control unit 122 stores the items of second flag information which are read from the ROM fuse block FB respectively in the corresponding second flag storage units Mb1 to Mbn at the time of activation of the memory system 100.

Subsequently, when executing a write or read operation on a write or read destination page specified from the memory controller 110, the control unit 122 refers to the first and second flag storage units Ma and Mb corresponding to a write or read destination block B to which the specified write or read destination page belongs, and according to the status of the referred first and second flag information, the control unit 122 executes switching control on the usage restriction on the specified write or read page (for example, whether the first usage restriction is to be imposed or not and whether the second usage restriction is to be imposed or not).

The first flag storage units Ma1 to Man and the second flag storage units Mb1 to Mbn may be provided outside the control unit 122 and may be included, for example, in the row decoder 128, the data latch unit 125, etc.

Figure 4:
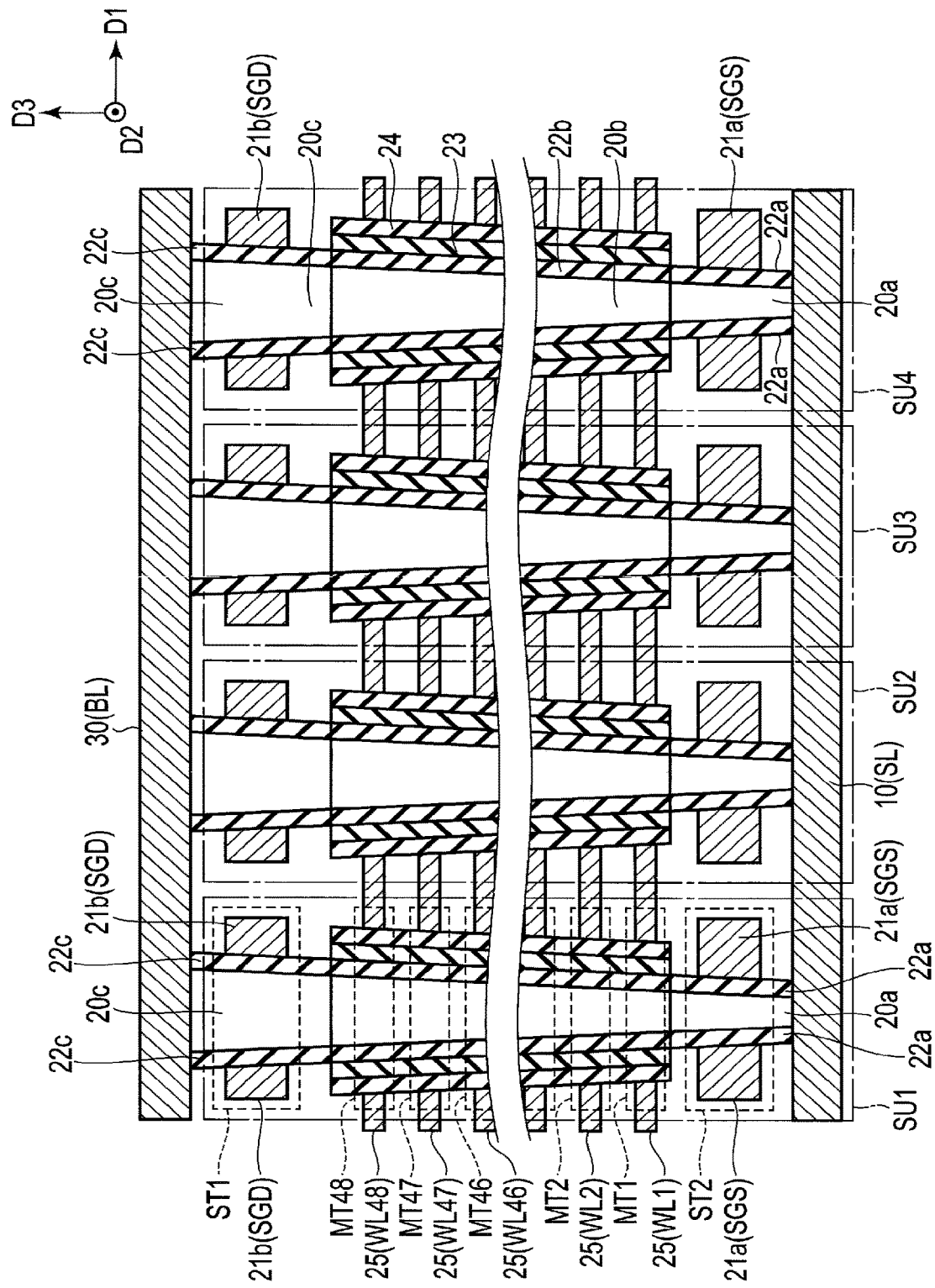
FIG. 4 is a cross section diagram showing an example of the configuration of the memory cell array.

Next, the detailed configuration of the memory cell array 130 according to the first embodiment will be described with reference to FIGS. 2 to 4.

The memory cell array 130 shown in FIG. 2 includes a plurality of nonvolatile memory cell transistors, and each of the nonvolatile memory cell transistors is associated with a word line and a bit line. Further, the memory cell array 130 includes the blocks B1 to Bn which are sets of a plurality of nonvolatile memory cell transistors.

Each of the blocks B1 to Bn includes a NAND string 131 in which memory cell transistors are connected in series. Further, the memory cell array 130 includes a plurality of string units SU1 to SUm which are sets of NAND strings 131. If the string units SU1 to SUm are not differentiated from each other, the string units SU1 to SUm will be hereinafter referred to as string units SU. The number of blocks (n) in the memory cell array 130 and the number of string units (m) in one block B are arbitrary numbers.

In the block B1, a plurality of columns having a configuration shown in FIG. 3 are provided in the vertical direction of the sheet of paper. In the first embodiment, the block B includes, for example, m string units SUB1 to SUm. Further, each of the string units SU1 to SUm includes a plurality of NAND strings 131 in the vertical direction of the sheet of paper of FIG. 3.

Each of the NAND strings 131 includes, for example, 48 memory cell transistors MT1 to MT48 and select transistors ST1 and ST2. Each of the memory cell transistors MT1 to MT48 includes a stacked gate including a control gate and a charge storage layer, and holds data in a nonvolatile manner. The number of memory cell transistors MT is not limited to 48 but may be 8, 16, 32, 64, 128, etc., and is not limited to any particular number.

If the memory cell transistors MT1 to MT48 are not differentiated from each other, the memory cell transistors MT1 to MT48 will be hereinafter referred to simply as memory cell transistors MT.

The memory cell transistors MT are arranged such that the memory cell transistors MT are connected in series between the select transistor ST1 and the select transistor ST2.

Gates of the select transistors ST1 of the string units SU1 to SU4 are connected respectively to select gate lines SGD1 to SGD4, and Gates of the select transistors ST2 of the string units SU1 to SU4 are connected respectively to select gate lines SGS1 to SGS4. On the other hand, the control gates of the memory cell transistors MT1 to MT48 in the same block B1 are connected in common to word lines WL1 to WL48, respectively. If the word lines WL1 to WL48 are not differentiated from each other, the word lines WL1 to WL48 will be hereinafter referred to simply as word lines WL.

While the word lines WL1 to WL48 are connected in common among the string units SU1 to SU4 in the same block B1, the select gate lines SGD and SGS of the string units SU1 to SU4 are independent from each other even in the same block B1.

Further, among the NAND strings 131 arranged in a matrix in the memory cell array 130, the other ends of the select transistors ST1 of the NAND strings 131 in the same row are connected in common to any of bit lines BL (BL1 to BLk where k is a natural number greater than or equal to two). That is, the bit line BL is connected in common to the NAND strings 131 among the blocks B. Further, the other ends of the current paths of the select transistors ST2 are connected in common to a source line SL. The source line SL is connected in common to the NAND strings 131, for example, among the blocks B.

As described above, data of the memory cell transistors MT in the same block B is collectively erased. On the other hand, data is read and programmed collectively by the memory cell transistors MT connected in common to any of the word lines WL in any of the string units SU of any of the blocks B. A unit to which data is collectively written as described above is referred to as a page.

Next, an example of the sectional structure of the memory cell array 130 will be briefly described with reference to FIG. 4. A plurality of structures shown in FIG. 4 are arrayed in the depth direction (D2 direction) of the sheet of paper of FIG. 4, and these structures share the word line WL, the select gate lines SGD and SGS and constitute one string unit SU.

A source line (SL) 10 is formed above a semiconductor substrate which is not shown in the drawing. As shown in FIG. 4, a conductive film 21a which functions as the select gate line SGS is formed above the source line (SL) 10. Further, a plurality of conductive films (for example, polycrystalline silicon films) 25 which function as the word lines WL are formed above the conductive film (for example, polycrystalline silicon film) 21a. Still further, a conductive film (for example, a polycrystalline silicon film) 21b which functions as the select gate line SGD is formed above the conductive films 25. Still further, interelectrode insulating films are formed among the conductive films 21a, 21b and 25 such that the conductive films 21a, 21b and 25 are electrically separated from each other in a D3 direction. More specifically, the conductive films 25 and the interelectrode insulating films are alternately stacked in the D3 direction.

Still further, a memory hole which extends in a direction perpendicular to the surface of the semiconductor substrate (D3 direction: a direction orthogonal to the D2 direction) is formed in the conductive films 21a, 21b and 25 and the interelectrode insulating films. In the present specification, the diameter of the memory hole in a plane parallel to a D1 direction (a direction orthogonal to the D2 direction and the D3 direction) and the D2 direction is referred to as an MH diameter. In the first embodiment, the memory hole is formed in a multilayer film composed of the conductive films 21a, 21b and 25 and the interelectrode insulating films, etc. In this case, an upper layer area of the multilayer film is etched more than a lower layer area of the multilayer film. Therefore, the MH diameter of the memory hole in the upper layer area is greater than the MH diameter of the memory hole in the lower layer area. The difference in the MH diameter increases as the etching distance of the memory hole (in the D3 direction) increases.

A gate insulating film 22a and a semiconductor layer 20a are sequentially formed on the inner wall of the memory hole formed in an area which serves as the select transistor ST2, and a columnar structure is formed as a result.

A block insulating film 24, a charge storage layer (insulating film) 23, a gate insulating film 22b and a semiconductor layer 20b are sequentially formed on the inner wall of the memory hole formed in an area which serves as the memory cell transistor MT, and a columnar structure is formed as a result.

A gate insulating film 22c and a semiconductor layer 20c are sequentially formed on the inner wall of the memory hole formed in an area which serves as the select transistor ST1, and a columnar structure is formed as a result.

The semiconductor layer 20b is an area in which a channel is formed in operation of the memory cell transistor MT. Further, a bit line layer 30 is formed on the semiconductor layer 20c.

FIG. 5 is a block diagram showing an example of the relationship of the block B to the first and second flag storage units Ma and Mb according to the first embodiment.

More specifically, the block B1 is associated with the first and second flag storage units Ma1 and Mb1. The block B2 is associated with the first and second flag storage units Ma2 and Mb2. The block B3 is associated with the first and second flag storage units Ma3 and Mb3. The block B4 is associated with the first and second flag storage units Ma4 and Mb4.

Each of the blocks B1 to B4 includes a plurality of word lines WL1 to WL100. However, the number of word lines WL in each of the blocks B1 to B4 only needs to be greater than or equal to two. The word lines WL1 to WL100 correspond respectively to page P1 to P100. If the pages P1 to P100 are not differentiated from each other, the pages P to P100 will be hereinafter referred to as pages P.

In FIG. 5, the first flag information is information indicating whether the pages P1 to P50 corresponding to word lines W1 to W50 on the lower layer side among the word lines W1 to W100 stacked in the corresponding block B are to be disabled or not.

Further, the second flag information is information indicating whether the pages P51 to P100 corresponding to word lines W51 to W100 on the upper layer side among the word lines W1 to W100 stacked in the corresponding block B are to be disabled or not.

In FIG. 5, pages P corresponding to shaded word lines WL are assumed to be in an unavailable state, and pages P corresponding to unshaded word lines WL are assumed to be in an available state.

All the pages P1 to P100 are assumed to be available in the block B1. In this case, the first and second flag storage units Ma1 and Mb1 corresponding to the block B1 store the first and second flag information indicative of available states "OK".

In the block B2, the pages P1 to P50 corresponding to the word lines WL1 to WL50 formed on the lower layer are unavailable, but the pages P51 to P100 corresponding to the word lines WL51 to WL100 formed on the upper layer are available. In this case, the first flag storage unit Ma2 corresponding to the lower layer of the block B2 stores the first flag information indicative of an unavailable state "NG". The second flag storage unit Mb2 corresponding to the upper layer of the block B2 stores the second flag information indicative of the available state "OK".

In the block B3, the pages P1 to P50 corresponding to the word lines WL1 to WL50 formed on the lower layer are available, but the pages P51 to P100 corresponding to the word lines WL51 to WL100 formed on the upper layer are unavailable. In this case, the first flag storage unit Ma3 corresponding to the lower layer of the block B3 stores the first flag information indicative of the available state "OK". The second flag storage unit Mb3 corresponding to the upper layer of the block B3 stores the second flag information indicative of the unavailable state "NG".

In the block B4, the pages P1 to P50 corresponding to the word lines WL1 to WL50 formed on the lower layer are unavailable, and the pages P51 to P100 corresponding to the word lines WL51 to WL100 formed on the upper layer are also unavailable. In this case, both the first flag information of the first flag storage unit Ma4 corresponding to the lower layer of the block B4 and the second flag information of the second flag storage unit Mb4 corresponding to the upper layer of the block B4 indicate the unavailable states "NG".

The control unit 122 recognizes a write destination page P specified from the memory controller 110 and a write destination block B to which the specified write destination page P belongs, and determines whether the word line WL corresponding to the specified write destination page P belongs to the lower layer or the upper layer.

Further, if the word line WL corresponding to the specified write destination page P belongs to the lower layer, the control unit 122 enables or disables the data write operation according to the first flag information of the first flag storage unit Ma corresponding to the lower layer of the write destination block B, and the control unit 122 writes data to the specified write destination page P if the data write operation is executable, and does not write data to the specified write destination page P if the data write operation is not executable.

On the other hand, if the word line WL corresponding to the specified write destination page P belongs to the upper layer, the control unit 122 enables or disables the data write operation according to the second flag information of the second flag storage unit Mb corresponding to the upper layer of the write destination block B, and the control unit 122 writes data to the specified write destination page P if the data write operation is executable, and does not write data to the specified write destination page P if the data write operation is not executable.

Also in the case of a data read operation, data is read in the same manner as that of the data write operation.

More specifically, in a data read operation, the control unit 122 recognizes a read destination page P specified from the memory controller 110 and a read destination block B to which the specified read destination page P belongs. The control unit 122 determines whether the word line WL corresponding to the specified read destination page P belongs to the lower layer or the upper layer. Subsequently, if the word line WL corresponding to the specified read destination page P belongs to the lower layer, the control unit 122 enables or disables the data read operation according to the first flag information of the first flag storage unit Ma corresponding to the lower layer of the read destination block B. The control unit 122 reads data from the specified read destination page P if the data read operation is executable, and does not read data from the specified read destination page P if the data read operation is not executable.

On the other hand, if the word line WL corresponding to the specified read destination page P belongs to the upper layer, the control unit 122 enables or disables the data read operation according to the second flag information of the second flag storage unit Mb corresponding to the upper layer of the read destination block B. The control unit 122 reads data from the specified read destination page P if the data read operation is executable, and does not read data from the specified read destination page P if the data read operation is not executable.

FIG. 6 is a flowchart showing an example of a process of setting the first and second flag information to the blocks B according to the first embodiment.

In the following explanation, a first mode represents write and read operations in a case where the first flag information indicates the unavailable state "NG" and the second flag information indicates the available state "OK".

A second mode represents write and read operations in a case where the first flag information indicates the available state "OK" and the second flag information indicates the unavailable state "NG".

In the first embodiment, the first mode is a mode in which the pages P corresponding to the word lines WL belonging to the lower layer of the block B are unavailable and the pages P corresponding to the word lines WL belonging to the upper layer of the block B are available.

Further, the second mode is a mode in which the pages P corresponding to the word lines WL belonging to the lower layer of the block B are available and the pages P corresponding to the word lines WL belonging to the upper layer of the block B are unavailable.

In step S601, the control unit 122 selects a block B which is subjected to the setting of the first flag information and the second flag information from the blocks B1 to Bn of the memory cell array 130.

In step S602, the control unit 122 determines whether each of the pages P in the selected block B is normally available or not, for example, by writing and reading sample data on trial, etc.

If each of the pages P in the selected block B is normally available, the control unit 112 sets the first flag information and the second flag information corresponding to the selected block B to the available state "OK" in step S603. Subsequently, the process proceeds to step S607.

If each of the pages P in the selected block B is not normally available, the control unit 122 determines whether the selected block B is available in the first mode or the second mode in step S604.

If the selected block B is available in the first mode or the second mode, the control unit 122 sets one of the first flag information and the second flag information corresponding to the selected block B to the available state "OK" and sets the other one to the unavailable state "NG" in step S605. Subsequently, the process proceeds to step S607.

If the selected block B is not available in the first and second modes, the control unit 122 sets both the first flag information and the second flag information corresponding to the selected block B to the unavailable states "NG" in step S606. Subsequently, the process proceeds to step S607.

In step S607, the control unit 122 determines whether all the blocks B1 to Bn which need to be subjected to the setting are selected or not.

If all the blocks B1 to Bn which need to be subjected to the setting are not yet selected, the process returns to step S601.

If all the blocks which need to be subjected to the setting are already selected, the control unit 122 stores the first and second flag information on the blocks B1 to Bn in the ROM fuse block FB.

In FIG. 6, the first and second flag information on the blocks B1 to Bn are collectively stored in the ROM fuse block FE after the settings of the first and second flag information on the blocks B1 to Bn are finished. However, the first and second flag information may be sequentially stored in the ROM fuse block FB each time the first and second flag information is set to each of the blocks B1 to Bn.

Figure 7:
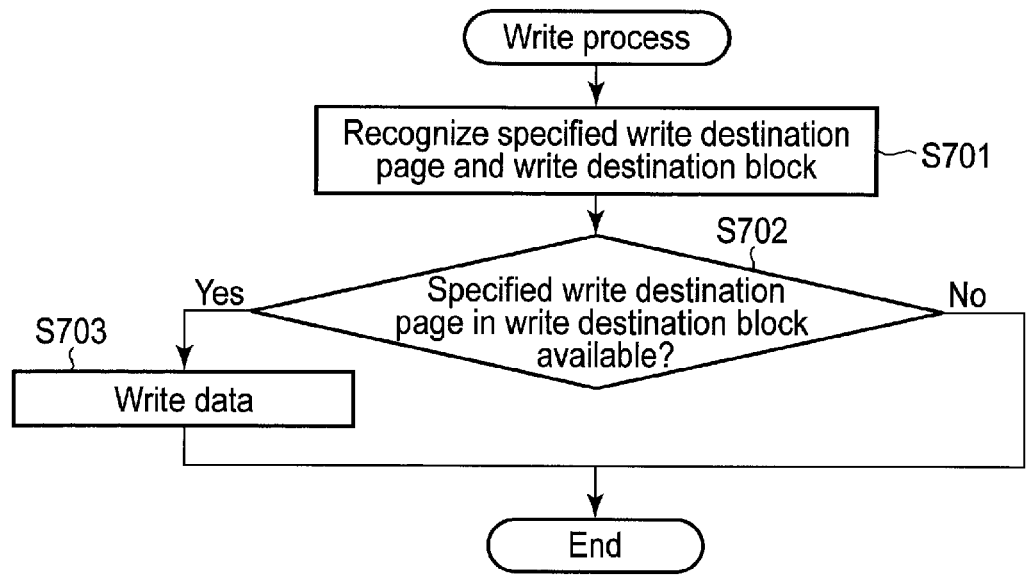
FIG. 7 is a flowchart showing an example of a write process of a control unit according to the first embodiment.

FIG. 7 is a flowchart showing an example of a write process of the control unit 122 according to the first embodiment. A process similar to the write process shown in FIG. 7 may be executed as an erase process on the block B.

In step S701, the control unit 122 recognizes a write destination page P specified from the memory controller 110 and a write destination block B to which the specified write destination page P belongs.

In step S702, the control unit 122 refers to the first flag storage unit Ma or the second flag storage unit Mb corresponding to the recognized write destination block B and the specified write destination page P and determines whether the result of reference indicates the available state or not.

If the specified write destination page P in the write destination block B is available, the control unit 122 writes data to the specified write destination page P in the write destination block B in step S703.

If the specified write destination page P in the write destination block B is unavailable, the control unit 122 does not execute, for example, the subsequent process (for example, an internal operation) related to the write operation. For example, if the control unit 122 then executes a status read, the control unit 122 returns a value (for example, 1) indicative of Fail which is set to a storage unit (for example, a bit) corresponding to Pass/Fail to the memory controller 110 via the input/output buffer 121.

If the specified write destination page P is unavailable, the control unit 122 may not execute a data write operation, for example, but may respond to the memory controller 110 via the input/output buffer 121 that the specified write destination page P in the write destination block B is unavailable, for example. Alternatively, if the specified write destination page P is unavailable, for example, the control unit 122 may select an available block and an available page, write data to the selected available block and available page and return write position information (for example, an address) which specifies the selected available block and available page via the input/output buffer 121.

Figure 8:
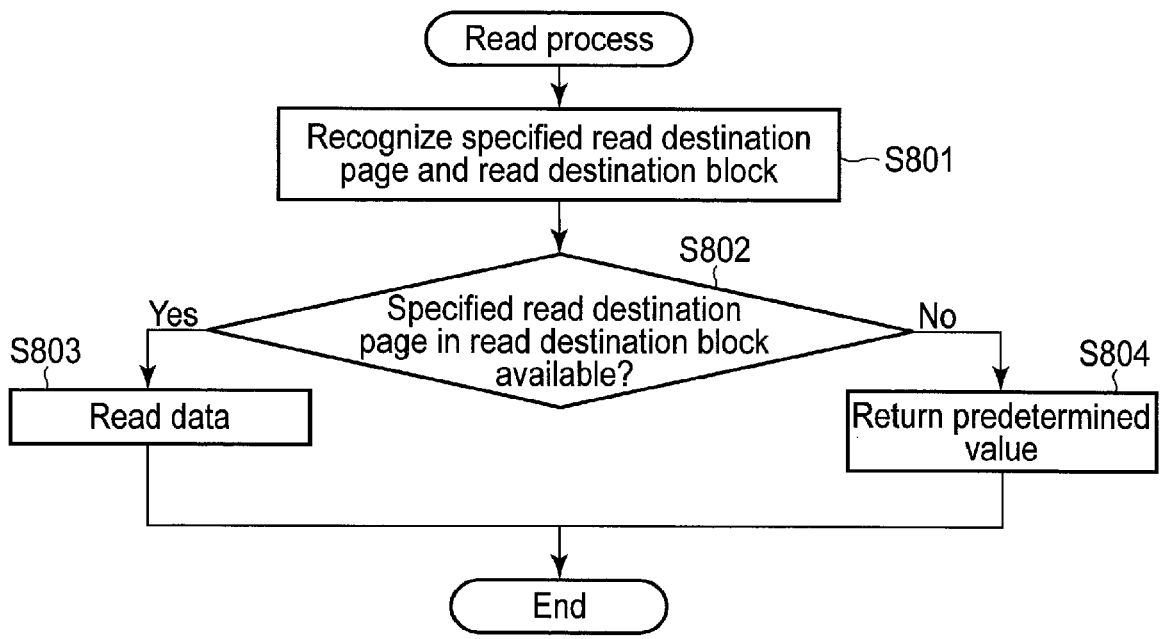
FIG. 8 is a flowchart showing an example of a read process of the control unit according to the first embodiment.

FIG. 8 is a flowchart showing an example of a read process of the control unit 122 according to the first embodiment.

In step S801, the control unit 122 recognizes a read destination page P specified from the memory controller 110 and a read destination block B to which the specified read destination page P belongs.

In step S802, the control unit 122 refers to the first flag storage unit Ma or the second flag storage unit Mb corresponding to the recognized read destination block B and the specified read destination page P and determines whether the result of reference indicates the available state or not.

If the specified read destination page P in the read destination block B is available, the control unit 122 reads data from the specified read destination page P in the read destination block B and returns the read data to the memory controller 110 via the input/output buffer 121 in step S803.

If the specified read destination page P in the read destination block B is unavailable, for example, the control unit 122 does not execute the subsequent process (for example, an internal operation) related to the write operation and returns a predetermined value (for example, 00 as a hexadecimal digit) to the memory controller 110 via the input/output buffer 121 in step S804.

If the specified read destination page P is unavailable, for example, the control unit 122 may return other information indicating that the specified read destination page P in the read destination block B is unavailable, to the memory controller 110 via the input/output buffer 121.

Advantages of the above-described first embodiment will be described below.

As a comparative example of the first embodiment, a case where the entire block B is disabled if the block B includes a page determined to be unavailable will be examined. In the comparative example, if a part of the pages in the block B becomes unavailable, the use of many available pages in the block B which operate normally is also restricted. As a result, the memory capacity available for the user will decrease.

On the other hand, in the first embodiment, whether Available or Unavailable can be determined by a plurality of units smaller than the size of the block B (for example, by a group of word lines WL or by a group of pages) by increasing the number of flag storage units which store information on whether pages P belonging to each of the blocks B are available or not.

More specifically, in the first embodiment, the block B is managed in the state of being divided into the word lines WL1 to WL50 on the lower layer and the word lines WL51 to WL100 on the upper layer. The word lines WL1 to WL100 correspond to the pages P1 to P100, respectively. The first flag storage unit Ma and the second flag storage unit Mb correspond to the word WL1 to WL50 on the lower layer and the word lines WL51 to WL100 on the upper layer. If any of the word lines WL1 to WL50 on the lower layer is unavailable, the first flag information of the first flag storage unit Ma is set to the unavailable state. If any of the word lines WL51 to WL100 on the upper layer is unavailable, the second flag information of the second flag storage unit Mb is set to the unavailable state. If an error which affects all the layers of word lines WL1 to WLn of a block B occurs and the entire block B is to be disabled, the first flag information of the first flag storage unit Ma is set to the unavailable state, and the second flag information of the second flag storage unit Mb is also set to the unavailable state. For example, the control unit 122 switches a flag storage unit to be referred according to the address of a word line to be accessed, and manages the use of a word line WL in an access destination block B specified from the main controller 100.

In the first embodiment which executes such control, even if a part of pages in the block B of the memory cell array 130 is detected to be unavailable, available pages in the block B can be maintained to be available.

Therefore, the memory capacity available in the nonvolatile memory device 120 of the first embodiment will be larger than the memory capacity of the comparative example. In the first embodiment, since the reduction of the data capacity of the nonvolatile memory device 120 is limited, the user can efficiently use the nonvolatile memory device 120.

Second Embodiment

In the second embodiment, a modification of the above-described first embodiment will be described.

The nonvolatile memory device 120 according to the second embodiment specifies an available bit of the memory cell transistor MT by the first flag information and the second flag information.

Figure 9:
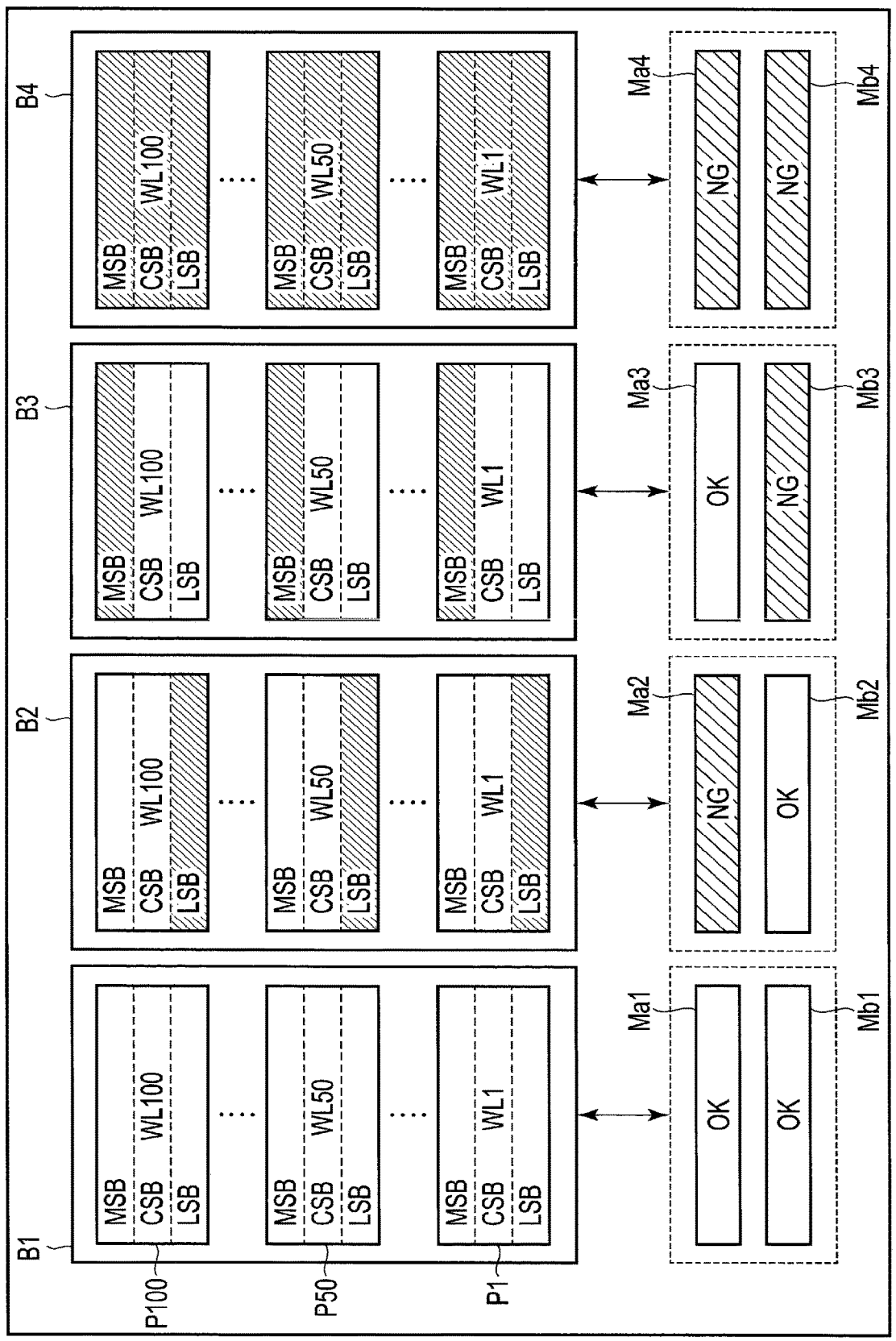
FIG. 9 is a block diagram showing an example of the relationship of the blocks to the first and second flag storage units according to the second embodiment.

FIG. 9 is a block diagram showing an example of the relationship of the block B to the first and second flag storage units Ma and Mb according to the second embodiment.

In the second embodiment, each of the memory cell transistors MT included in the memory cell array 130 is assumed to be a triple level cell (TLC). In the TLC, three bits of information can be stored in one memory cell transistor MT. However, each of the memory cell transistors MT may be a single-level cell (SLC) which can store one bit of information or a multi-level cell (MLC) which can store two bits of information, or may also be able to store four or more bits of information.

Among the three bits of the TLC, the lowest-level bit is a least-significant bit (LSB), the intermediate-level bit is a center significant bit (CSB), and the highest-level bit is a most-significant bit (MSB).

In the second embodiment, the first flag storage unit Ma of the block B is associated with the LSB in the block B.

Further, the second flag storage unit Mb of the block B is associated with the MSB in the block B.

However, the association of the first and second flag information storage units Ma and Mb with the LSB, CSB and MSB can be freely changed, and for example, the first flag storage unit Ma may be associated with the CSB or MSB, and the second flag storage unit Mb may be associated with the LSB or CSB.

The first flag storage unit Ma stores the first flag information indicative of the available state "OK" if the LSB is available in the corresponding block B, and stores the first flag information indicative of the unavailable state "NG" if the LSB is unavailable in the corresponding block B.

The second flag storage unit Mb stores the second flag information indicative of the available state "OK" if the MSB is available in the corresponding block B, and stores the second flag information indicative of the unavailable state "NG" if the MSB is unavailable in the corresponding block B.

Further, the first and second flag storage units Ma and Mb may store the first and second flag information indicative of the unavailable states "NG" if the SCB is unavailable in the corresponding block B.

In FIG. 9, shaded LSBs, CSBs and MSBs are assumed to be in the unavailable state, and unshaded LSBs, CSBs and MSBs are assumed to be in the available state.

In the block B1, all of the LSB, the CSB and the MSB are assumed to be available. In this case, the first and second flag storage units Ma1 and Mb1 corresponding to the block B1 store the first and second flag information indicative of the available states "OK".

In the block B2, the LSB is assumed to be unavailable, and the CSB and the MSB are assumed to be available. In this case, the first flag storage unit Ma2 corresponding to the LSB of the block B2 stores the first flag information indicative of the unavailable state "NG". The second flag storage unit Mb2 corresponding to the MSB of the block B2 stores the second flag information indicative of the available state "OK".

In the block B3, the LSB and the CSB are assumed to be available, and the MSB is assumed to be unavailable. In this case, the first flag storage unit Ma3 corresponding to the LSB of the block B3 stores the first flag information indicative of the available state "OK". The second flag storage unit Mb3 corresponding to the MSB of the block B3 stores the second flag information indicative of the unavailable state "NG".

In the block B4, the LSB, the CSB and the MSB are assumed to be unavailable. In this case, the first flag storage unit Ma4 corresponding to the LSB of the block B4 stores the first flag information indicative of the unavailable state "NG". The second flag storage unit Mb4 corresponding to the MSB of the block B4 stores the second flag information indicative of the unavailable state "NG".

In a data write operation, the control unit 122 recognizes a write destination block B to which a write destination page P specified from the memory controller 110 belongs.

Further, the control unit 122 refers to the first and second flag information of the first and second flag storage units Ma and Mb corresponding to the write destination block B and recognizes an available bit among the LSB, CSB and MSB.

If an available bit exists, the control unit 122 writes data using an available bit without using an unavailable bit. If no available bit exists, the control unit 122 disables the write operation on the specified write destination page P.

Also in the case of a data read operation, data is read in the same manner as that of the data write operation. More specifically, in a data read operation, the control unit 122 recognizes a read destination block B to which a read destination page P specified from the memory controller 110 belongs.

The control unit 122 refers to the first and second flag information of the first and second flag storage units Ma and Mb corresponding to the read destination block B and recognizes an available bit among the LSB, CSB and MSB.

If an available bit exists, the control unit 122 reads data using an available bit without using an unavailable bit. If no available bit exists, the control unit 122 disables the read operation on the specified read destination page P.

In the above-described second embodiment, the first flag information and the second flag information are set to each of the blocks B based on whether the LSB, CSB and MSB of the TLC are available or unavailable.

Further, the control unit 122 switches a bit used for write and read operations according to the first and second flag information.

Accordingly, even if any of the LSB, CSB and MSB of the TLC is unavailable in the block B, available bits in the block B can be continuously used.

Therefore, as compared to the memory capacity of a case where the entire block B is disabled if a part of the bits in the block B is detected to be unavailable, the memory capacity available in the nonvolatile memory device 120 of the second embodiment will increase. In the second embodiment, since the reduction of the data capacity of the nonvolatile memory device 120 is limited, the user can efficiently use the nonvolatile memory device 120.

Third Embodiment

In the third embodiment, a modification of the above-described first embodiment will be described.

The nonvolatile memory device 120 according to the third embodiment specifies a threshold voltage used for the memory cell transistor MT by the first flag information and the second flag information.

Figure 10:
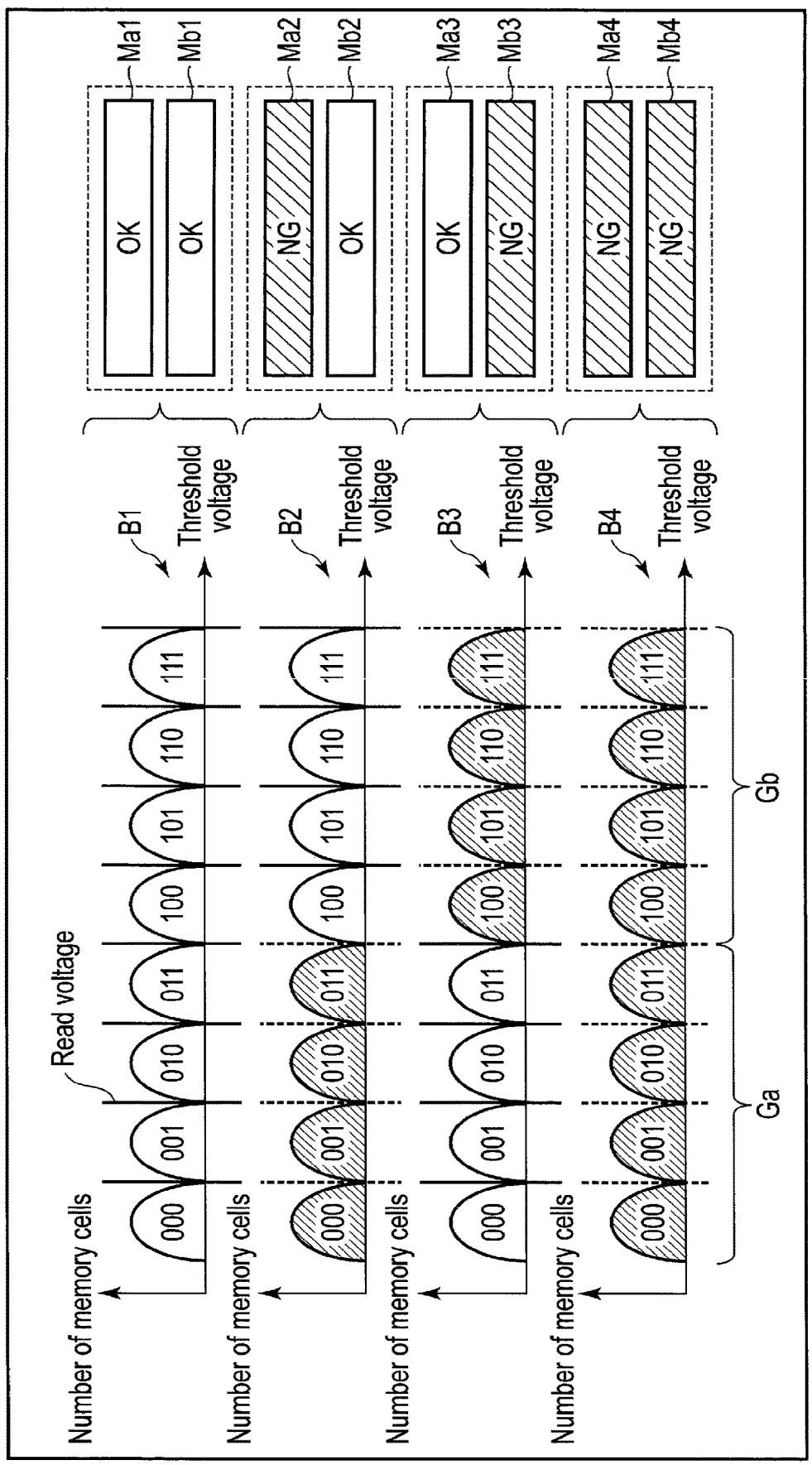
FIG. 10 is a block diagram showing an example of the relationship of the blocks to the first and second flag storage units according to the third embodiment.

FIG. 10 is a block diagram showing an example of the relationship of the block B to the first and second flag storage units Ma and Mb according to the third embodiment.

In the third embodiment, each of the memory cell transistors MT included in the memory cell array 130 can store, for example, three bits of information, more specifically, values 000 to 111. However, values which are storable in the memory cell transistor MT can be appropriately changed.

In the graph shown in FIG. 10, the horizontal axis shows a threshold voltage held by the memory cell transistor MT, and the vertical axis shows the number of memory cell transistors MT of each of the blocks B1 to B4.

Data is read from the memory cell transistor MT by changing a read voltage applied to the memory cell transistor MT and detecting read voltages between which the threshold voltage of the memory cell transistor MT exists.

In the third embodiment, the first flag storage unit Ma of the block B is associated with the values 000 to 011 (a group Ga) corresponding to the lower threshold voltages.

Further, the second flag storage unit Mb of the block B is associated with the values 100 to 111 (a group Gb) corresponding to the upper threshold voltages.

However, the association of the first and second flag information storage units Ma and Mb with the values can be freely changed, and for example, the first flag storage unit Ma may be associated with the values 000 to 010, and the second flag storage unit Mb may be associated with the values 011 to 111.

The first flag storage unit Ma stores the first flag information indicative of the available state "OK" if the values 000 to 011 are available in the corresponding block B, and stores the first flag information indicative of the unavailable state "NG" if the values 000 to 011 are unavailable in the corresponding block B.

The second flag storage unit Ma stores the second flag information indicative of the available state "OK" if the values 100 to 111 are available in the corresponding block B, and stores the second flag information indicative of the unavailable state "NG" if the values 100 to 111 are unavailable in the corresponding block B.

In FIG. 10, shaded values are assumed to be unavailable, and unshaded values are assumed to be available.

In the block B1, all the values 000 to 111 are assumed to be available. In this case, the first and second flag storage units Ma1 and Mb1 corresponding to the block B1 store the first and second flag information indicative of the available state "OK".

In the block B2, the lower values 000 to 011 are assumed to be unavailable, and the upper values 100 to 111 are assumed to be available. In this case, the first flag storage unit Ma2 of the block B2 stores the first flag information indicative of the unavailable state "NG". The first flag storage unit Mb2 of the block B2 stores the second flag information indicative of the available state "OK".

In the block B3, the lower values 000 to 011 are assumed to be available, and the upper values 100 to 111 are assumed to be unavailable. In this case, the first flag storage unit Ma3 of the block B3 stores the first flag information indicative of the available state "OK". The second flag storage unit Mb3 of the block B3 stores the second flag information indicative of the unavailable state "NG".

In the block B4, all the values 000 to 111 are assumed to be unavailable. In this case, the first flag storage unit Ma4 of the block B4 stores the first flag information indicative of the unavailable state "NG". The second flag storage unit Mb4 of the block B4 stores the second flag information indicative of the unavailable state "NG".

In the case of a data write operation, the control unit 122 recognizes a write destination block B to which a write destination page P specified from the memory controller 110 belongs.

Further, the control unit 122 refers to the first and second flag information of the first and second flag storage units Ma and Mb corresponding to the write destination block B and recognizes an available value.

Still further, the control unit 122 writes data within the range of an available value without using an unavailable value.

Also in the case of a data read operation, data is read in the same manner as that of the data write operation. More specifically, in a data read operation, the control unit 122 recognizes a read destination block B to which a read destination page P specified from the memory controller 110 belongs.

The control unit 122 refers to the first and second flag information of the first and second flag storage units Ma and Mb corresponding to the read destination block B and recognizes an available value.

Further, the control unit 122 reads data within the range of an available value without using an unavailable value.

In the above-described third embodiment, for example, if the distribution of threshold voltages at a low level is collapsed and a read operation is not executable, the first flag information indicative of the unavailable state "NG" is set to the first flag storage unit Ma. In contrast to this, for example, if the distribution of threshold voltages at a high level is collapsed and a read operation is not executable, the second flag information indicative of the unavailable state "NG" is set to the second flag storage unit Mb. If a read operation is not executable by all the read voltages, the first and second flag information indicative of the unavailable states "NG" are set to the first and second flag storage units Ma and Mb. The control unit 122 switches application of a read voltage according to a write or read destination block B to which a write or read destination page P specified from the memory controller 110 belongs.

In the third embodiment, even if a read voltage is unavailable in the block B, the block B can be used continuously by using an available read voltage.

Therefore, as compared to the memory capacity of a case where the entire block B is disabled if a part of read voltages in the block B is detected to be unavailable, the memory capacity available in the nonvolatile memory device 120 of the third embodiment will increase. In the third embodiment, since the reduction of the data capacity of the nonvolatile memory device 120 is limited, the user can efficiently use the nonvolatile memory device 120.

Fourth Embodiment

In the fourth embodiment, a modification of the above-described first embodiment will be described.

The nonvolatile memory device 120 according to the fourth embodiment divides each of the pages P belonging to each of the blocks B into a plurality of parts, and determines whether the parts of each of the pages P are available or not.

Figure 11:
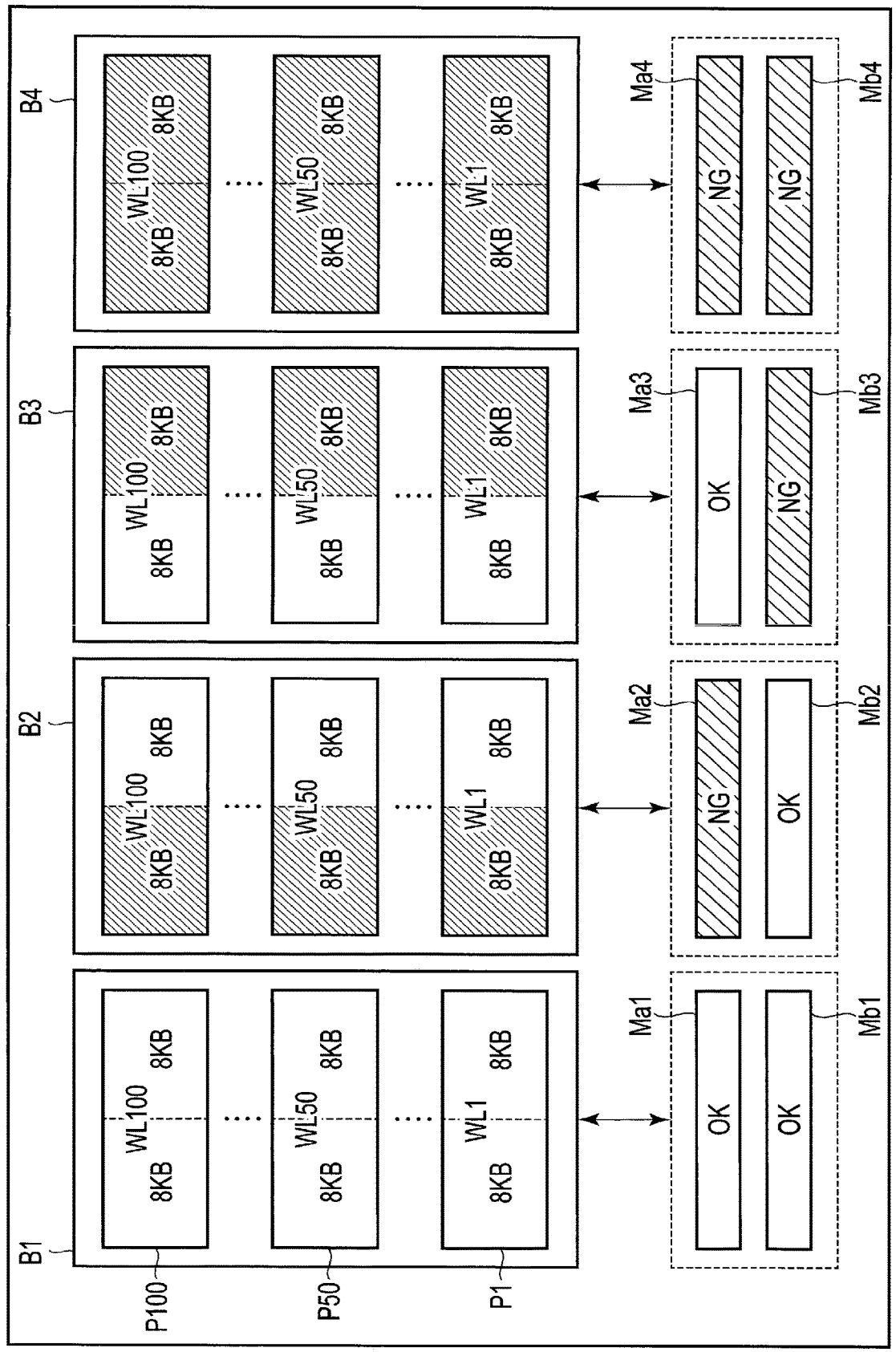
FIG. 11 is a block diagram showing an example of the relationship of the blocks to the first and second flag storage units according to the fourth embodiment.

FIG. 11 is a block diagram showing an example of the relationship of the block B to the first and second flag storage units Ma and Mb according to the fourth embodiment.

In the fourth embodiment, the word lines WL1 to WL100 are provided in each of the blocks B. The word lines WL1 to WL100 correspond to page P1 to P100, respectively. Each of the word lines WL1 to WL100 includes a plurality of memory cell transistors MT.

In the fourth embodiment, for each of the blocks B, the first flag information indicating whether a first part of the memory cell transistors MT provided in each of the pages P of the block B is available or not is stored in the first flag storage unit Ma. Here, the first part may be those among the memory cell transistors MT provided in each of the pages P which correspond to the first half of a byte.

Further, for each of the blocks B, the second flag information indicating whether a second part of the memory cell transistors MT provided in each of the pages P of the block B is available or not is stored in the second flag storage unit Mb. Here, the second part may be those among the memory cell transistors MT provided in each of the pages P which correspond to the second half of a byte.

In FIG. 11, a shaded part of each of the pages P is assumed to be in the unavailable state, an unshaded part of each of the pages P is assumed to be in the available state.

In the block B1, the memory cell transistors MT of both the first and second parts of each of the pages P are assumed to be available. In this case, the first and second flag storage units Ma1 and Mb1 corresponding to the block B1 store the first and second flag information indicative of the available state "OK".

In the block B2, the memory cell transistors MT belonging to the first part of each of the pages P are assumed to be unavailable, and the memory cell transistors MT belonging to the second part of each of the pages P are assumed to be available. In this case, the first flag storage unit Ma2 corresponding to the first part of each of the pages P of the block B2 stores the first flag information indicative of the unavailable state "NG". The second flag storage unit Mb2 corresponding to the second part of each of the pages P of the block B2 stores the second flag information indicative of the available state "OK".

In the block B3, the memory cell transistors MT belonging to the first part of each of the pages P are assumed to be available, and the memory cell transistors MT belonging to the second part of each of the pages P are assumed to be unavailable. In this case, the first flag storage unit Ma3 corresponding to the first part of each of the pages P of the block B3 stores the first flag information indicative of the available state "OK". The second flag storage unit Mb3 corresponding to the second part of each of the pages P of the block B3 stores the second flag information indicative of the unavailable state "NG".

In the block B4, the memory cell transistors MT of both the first part and the second part of each of the pages P are assumed to be unavailable. In this case, the first flag storage unit Ma4 corresponding to the block B4 stores the first flag information indicative of the unavailable state "NG". The second flag storage unit Mb4 corresponding to the block B4 also stores the second flag information indicative of the unavailable state "NG".

In the case of a data write operation, the control unit 122 recognizes a write destination block B to which a write destination page P specified from the memory controller 110 belongs.

Further, the control unit 122 refers to the first and second flag information of the first and second flag storage units Ma and Mb corresponding to the write destination block B and recognizes an available part of the first and second parts of the specified write destination page P.

Subsequently, the control unit 122 writes data to an available part without using an unavailable part of the specified write destination page P.

Also in the case of a data read operation, data is read in the same manner as that of the data write operation. More specifically, in a data read operation, the control unit 122 recognizes a read destination block B to which a read destination page P specified from the memory controller 110 belongs.

The control unit 122 refers to the first and second flag information of the first and second flag storage units Ma and Mb corresponding to the specified read destination block B and recognizes an available part of the first and second parts of the specified read destination page P.

Subsequently, the control unit 122 reads data from an available part without using an unavailable part of the specified read destination page P.

In the above-described fourth embodiment, since the first and second flag storage units Ma and Mb are provided for the block B, even if each of the pages P belonging to each of the blocks B includes an unavailable part, an available part thereof can be continuously used.

Therefore, as compared to the memory capacity of a case where the entire block B is disabled if a part of the page P belonging to the block B is detected to be unavailable, the memory capacity available in the nonvolatile memory device 120 of the fourth embodiment will increase. In the fourth embodiment, since the reduction of the data capacity of the nonvolatile memory device 120 is limited, the user can efficiently use the nonvolatile memory device 120.

Fifth Embodiment

In the fifth embodiment, a modification of the above-described first embodiment will be described.

The nonvolatile memory device 120 according to the fifth embodiment divides the string units SU belonging to each of the blocks B into a plurality of groups and determines whether each of the groups is available or not.

Figure 12:
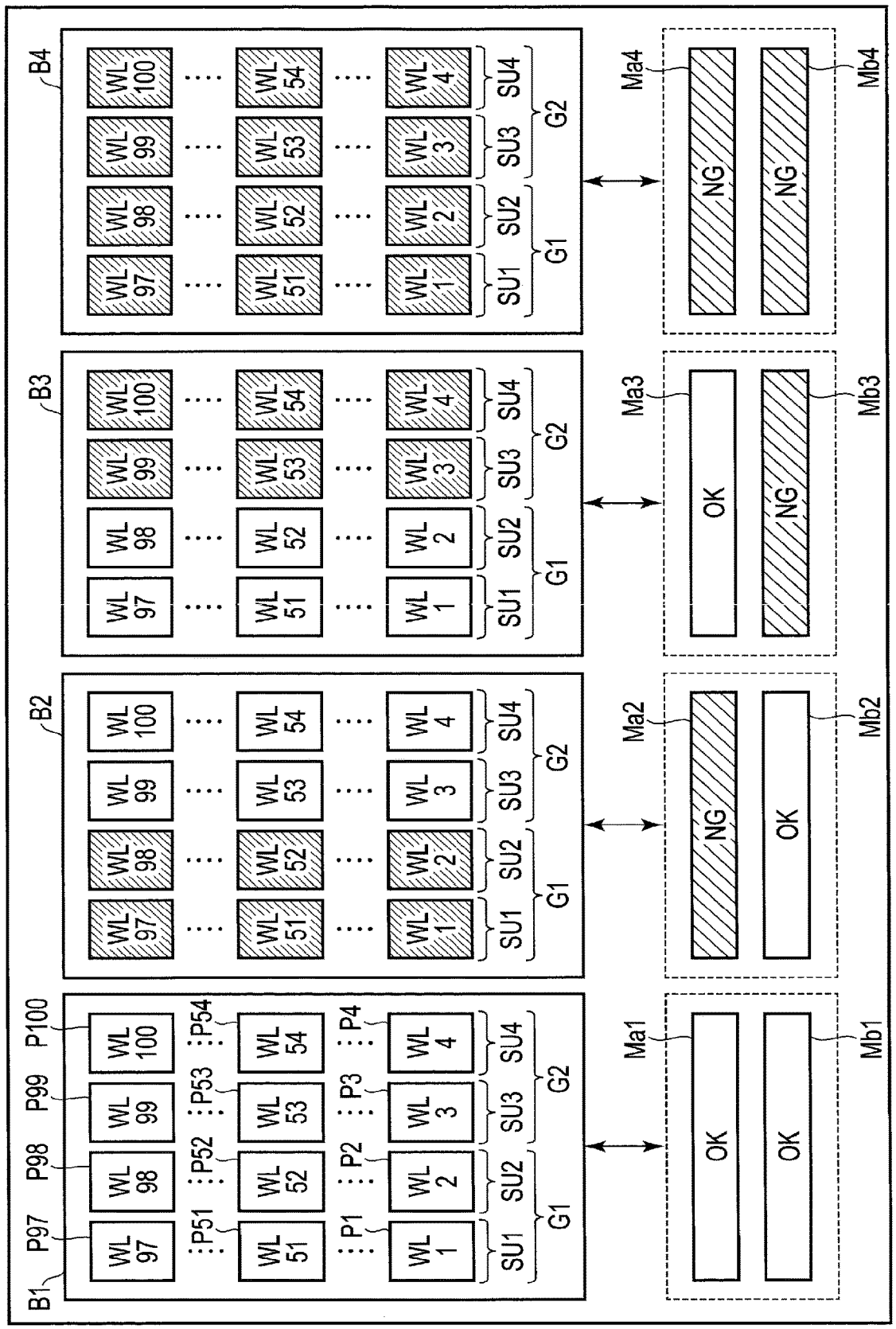
FIG. 12 is a block diagram showing an example of the relationship of the blocks to the first and second flag storage units according to the fifth embodiment.

FIG. 12 is a block diagram sowing an example of the relationship of the block B to the first and second flag storage units Ma and Mb according to the fifth embodiment.

As described above in the above-described first embodiment, each of the blocks B includes a plurality of string units SU. FIG. 12 shows a case where each of the blocks B1 to B4 includes the string units SU1 to SU4. However, the number of blocks B and the number of string units SU provided in one block B can be appropriately changed.

In the fifth embodiment, in each of the blocks B, the string units SU1 and SU2 are assumed to be categorized as a group G1. In each of the blocks B, the string units SU3 and SU4 are assumed to be categorized as a group G2. If the groups G1 and G2 are not differentiated from each other, the groups G1 and G2 will be hereinafter referred to as groups G.

For each of the blocks B, the first flag information indicating whether the group G1 is available or not is stored in the first flag storage unit Ma. For each of the blocks B, the second flag information indicating whether the group G2 is available or not is stored in the second flag storage unit Mb.

In FIG. 12, a shaded group between the groups G1 and G2 of each of the blocks B is assumed to be in the unavailable state, and an unshaded group between the groups G1 and G2 of each of the blocks B is assumed to be the available state.

In the block B1, both the group G1 including the string units SU1 and SU2 and the group G2 including the string units SU3 and SU4 are assumed to be available. In this case, the first and second flag storage units Ma1 and Mb1 corresponding to the block B1 store the first and second flag information indicative of the available states "OK".

In the block B2, the group G1 is assumed to be unavailable, and the group G2 is assumed to be available. In this case, the first flag storage unit Ma2 corresponding to the group G1 of the block B2 stores the first flag information indicative of the unavailable state "NG". The second flag storage unit Mb2 corresponding to the block B2 stores the second flag information indicative of the available state "OK".

In the block B3, the group G1 is assumed to be available, and the group G2 is assumed to be unavailable. In this case, the first flag storage unit Ma3 corresponding to the group G1 of the block B3 stores the first flag information indicative of the available state "OK". The second flag storage unit Mb3 corresponding to the group G2 of the block B3 stores the second flag information indicative of the unavailable state "NG".

In the block B4, both the group G1 and the group G2 are assumed to be unavailable. In this case, the first flag storage unit Ma4 corresponding to the group G1 of the block B4 stores the first flag information indicative of the unavailable state "NG". The second flag storage unit Mb4 corresponding to the group G2 of the block B4 also stores the second flag information indicative of the unavailable state "NG".

In the case of a data write operation, the control unit 122 recognizes a write destination block B and a write destination group G to which a write destination page P specified from the memory controller 110 belongs.

Further, the control unit 122 refers to the first flag information of the first flag storage units Ma or the second flag information of the second flag storage units Mb corresponding to the write destination block B and group G.

If the write destination group G in the write destination block B is available, the control unit 122 writes data to the specified write destination page P. If the write destination group G in the write destination block B is unavailable, the control unit 122 disables the data write operation on the specified write destination page P.

Also in the case of a data read operation, data is read in the same manner as that of the data write operation. More specifically, in a data read operation, the control unit 122 recognizes a read destination block B and a read destination group G to which a read destination page P specified from the memory controller 110 belongs.

Further, the control unit 122 refers to the first flag information of the first flag storage units Ma or the second flag information of the second flag storage units Mb corresponding to the read destination block B and group G.

If the read destination group G in the read destination block B is available, the control unit 122 reads data from the specified read destination page P. If the read destination group G in the read destination block B is unavailable, the control unit 122 disables the data read operation on the specified read destination page P.

In the above-described fifth embodiment, since the first and second flag storage units Ma and Mb are provided for each of the blocks B, even if a string unit is unavailable in the block B, another available string unit can be continuously used.

Therefore, as compared to the memory capacity of a case where the entire block B is disabled if a part of the string units belonging to the block B is detected to be unavailable, the memory capacity available in the nonvolatile memory device 120 of the fifth embodiment will increase. In the fifth embodiment, since the reduction of the data capacity of the nonvolatile memory device 120 is limited, the user can efficiently use the nonvolatile memory device 120.

In the fifth embodiment, the string units SU1 to SU4 of each of the blocks B1 to B4 are managed in the state of being divided into groups G1 and G2. However, the NAND strings of each of the blocks B1 to B4 may be managed in the state of being divided into a plurality of groups.

Sixth Embodiment

In the sixth embodiment, a modification of the above-described first to fifth embodiments will be described.

In the above-described first to fifth embodiments, the first and second flag storage units Ma and Mb are provided for each of the blocks B, and a usage restriction on the write and read operations on the memory cell array 130 is switched based on the first and second flag information stored in the first and second flag storage units Ma and Mb.

However, the switching of the usage restriction on the write and read operations is not limited to the examples of the first to fifth embodiments and may be performed under various rules.

These rules will be described below with reference to the first example shown in FIG. 13 and the second example shown in FIG. 14.

FIG. 13 is a block diagram showing an example of the nonvolatile memory device 120 which determines whether a plurality of memory areas E1 and E2 included in the block B are to be disabled or not based on temperature. FIG. 13 shows only constituent elements necessary for explanation and does not show constituent elements unnecessary for explanation.

The nonvolatile memory device 120 shown in FIG. 13 further includes a temperature sensor 132.

The control unit 122 receives a measured temperature value from the temperature sensor 132.

The data latch unit 125 includes the first flag storage unit Ma and the second flag storage unit Mb.

The first flag storage unit Ma stores first flag information 133a. The first flag information 133a indicates whether the first memory area E1 in the block B is to be disabled or not if the temperature value measured by the temperature sensor 132 exceeds a set temperature value (a temperature threshold value).

The second flag storage unit Mb stores second flag information 133b. The second flag information 133b indicates whether the second memory area E2 in the block B is to be disabled or not if the temperature value measured by the temperature sensor 132 exceeds a set temperature value.

If the temperature value measured by the temperature sensor 132 does not exceed the set temperature, the control unit 122 enables write and read operations on the first memory area E1 regardless of the first flag information 133a.

If the first flag information 133a indicates the unavailable state and the temperature value measured by the temperature sensor 132 exceeds the set temperature value, the control unit 122 disables write and read operations on the first memory area E1.

If the first flag information 133a indicates the available state, the control unit 122 enables write and read operations on the first memory area E1 regardless of the temperature value measured by the temperature sensor 132.

The control unit 122 also controls data write and read operations on the memory area E2 based on temperature similarly to the memory area E1.

Therefore, even if a part of areas of the block B is weak against high temperature, an area which is not weak against high temperature can be continuously used while an area which is weak against high temperature is disabled. Further, even an area which is weak against high temperature can be continuously used if the measured temperature value is a low temperature.

FIG. 14 is a block diagram showing an example of the nonvolatile memory device 120 which determines whether the memory areas E1 and E2 included in the block B is to be disabled or not based on reliability. FIG. 14 shows only constituent elements necessary for explanation and does not show constituent elements unnecessary for explanation.

The control unit 122 further includes a reliability determination unit 134. The reliability determination unit 134 determines whether data to be written or read is data (high-reliability data) which requires to store at reliability of greater than or equal to a predetermined value (a reliability threshold value) or not. The reliability determination unit 134 determines whether data requires reliability of greater than or equal to the predetermined value or not based on, for example, the category of the data. The reliability determination unit 134 determines that backup data or moving image data, etc., does not require reliability of greater than or equal to the predetermined value. Here, the control unit 122 may receive information such as the category of data, for example, from the host device 200 via the memory controller 110 and the input/output buffer 121.

Here, the value of reliability may increase, for example, as the error bit rate decreases. In other words, for example, the value of reliability may be obtained based on the rate at which data can be accurately read and written.

The first flag information 133a of the first flag storage unit Ma indicates whether write and read operations can be executed on the first memory area E1 in the corresponding block B with reliability of greater than or equal to the predetermined value or not.

The second flag information 133b of the second flag storage unit Mb indicates whether write and read operations can be executed on the second memory area E2 in the corresponding block B with reliability of greater than or equal to the predetermined value or not.

If the reliability determination unit 134 determines that the data to be written or read is not high-reliability data, the control unit 122 enables the read and write operations of the data in the first memory area E1.

The control unit 122 accesses the first flag information 133a. Then, if the write and read operations can be executed on the first memory area E1 with reliability of greater than or equal to the predetermined value (if the usage restriction is not to be imposed on the first memory area E1), the control unit 122 enables the data write and read operations.

If the write and read operations cannot be executed on the first memory area E1 with reliability of greater than or equal to the predetermined value (in other word, the usage restriction is to be imposed on the first memory area E1, or the first memory area E1 is the unavailable state for the high-reliability data), and the reliability determination unit 134 determines that the data to be written or read is high-reliability data, the control unit 122 disables the data write and read operations.

The control unit 122 also controls the data write and read operations on the memory area E2 based on reliability similarly to the memory area E1.

Accordingly, even if the reliability of a part of the areas of the block B is low, the low-reliability area can be continuously used for storing data which does not require reliability (data which does not require to store at reliability of greater than or equal to a predetermined value).

The above-described embodiments can be freely combined with each other. Each of the above-described constituent elements may be divided or may be combined with each other. Further, the arrangement of each of the above-described constituent elements can be appropriately changed.

In the above-described embodiments, whether the available state or the unavailable state is determined by dividing one block B into a plurality of memory areas, bits, bit values, etc. However, divisions thereof can be appropriately changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonvolatile memory device, comprising:
    a memory cell array comprising a plurality of erase unit areas each of which comprises a plurality of read unit areas;
    a plurality of first storage units which correspond respectively to the erase unit areas and store a plurality of items of first information indicating whether a first usage restriction is to be imposed on the corresponding erase unit areas;
    a plurality of second storage units which correspond respectively to the erase unit areas and store a plurality of items of second information indicating whether a second usage restriction is to be imposed on the corresponding erase unit areas; and
    a control unit configured to execute switching control on whether the first usage restriction is to be imposed or not based on the first information and whether the second usage restriction is to be imposed or not based on the second information on the memory cell array, wherein the memory cell array is a three-dimensional stacked flash memory and is formed above a substrate, the memory cell array comprising a source line above the substrate, a first select gate line above the source line, a plurality of word lines above the first select gate line, a second select gate line above the plurality of word lines, and a bit line above the second select gate line, the erase unit areas are a plurality of blocks, the read unit areas are a plurality of pages, each of the plurality of blocks includes a plurality of memory cells which are connected in series, a first end of a first select transistor connected in series to a first memory cell among the plurality of memory cells, a first end of a second select transistor connected in series to a second memory cell among the plurality of memory cells, the plurality of word lines connected to gates of the plurality of memory cells, respectively, the first select gate line connected to a gate of the first select transistor, and a second select gate line connected to a gate of the second select transistor, the source line is connected to a second end of the first select transistor, the bit line is connected to a second end of the second select transistor, the first usage restriction is to disable a word line of a lower layer side among the plurality of word lines stacked in the corresponding block, the second usage restriction is to disable a word line of an upper layer side among the word lines stacked in the corresponding block, when a read destination page specified by a controller corresponds to the word line of the lower layer side and the first information corresponding to a read destination block to which the read destination page belongs indicates that the first usage restriction is to be imposed, the control unit is configured to disable a read operation on the read destination page, when the read destination page corresponds to the word line of the upper layer side and the second information corresponding to the read destination block indicates that the second usage restriction is to be imposed, the control unit is configured to disable the read operation on the read destination page, the word line of the lower layer side includes first word lines, and the first word lines include a word line connected to a gate of the first memory cell, and the word line of the upper layer side includes second word lines, and the second word lines include a word line connected to a gate of the second memory cell.

2. The nonvolatile memory device of claim 1, further comprising a read only memory which stores the plurality of items of the first information corresponding respectively to the erase unit areas and stores the plurality of items of the second information corresponding respectively to the erase unit areas, wherein the control unit is configured to store the items of the first information read from the read only memory in the corresponding first storage units and store the items of the second information read from the read only memory in the corresponding second storage units at a time of activation.

3. The nonvolatile memory device of claim 1, further comprising a temperature sensor, wherein the first usage restriction is to disable a first area in the corresponding block when a temperature measured by the temperature sensor exceeds a set temperature, and the second usage restriction is to disable a second area in the corresponding block when a temperature measured by the temperature sensor exceeds a set temperature.

4. The nonvolatile memory device of claim 3, wherein the control unit is configured to:

determine that the first and second areas are available states when the temperature measured by the temperature sensor does not exceed the set temperature, determine that the first area is an unavailable state when the first information indicates that the first usage restriction is to be imposed on the first area and the temperature measured by the temperature sensor exceeds the set temperature, determine that the first area is the available state when the first information indicates that the first usage restriction is not to be imposed on the first area, determine that the second area is the unavailable state when the second information indicates that the second usage restriction is to be imposed on the second area and the temperature measured by the temperature sensor exceeds the set temperature, and determine that the second area is the available state when the second information indicates that the second usage restriction is not to be imposed on the second area.

5. The nonvolatile memory device of claim 1, wherein the first usage restriction is to restrict use of a first area in the corresponding block for high-reliability data which requires reliability of greater than or equal to a predetermined value, and the second usage restriction is to restrict use of a second area in the corresponding block for the high-reliability data.

6. The nonvolatile memory device of claim 5, wherein the control unit is configured to:

determine whether data to be written or read is the high-reliability data which requires to store at the reliability of greater than or equal to the predetermined value or not, determine that the first and second areas are available states when the data is not the high-reliability data, determine that the first area is the available state when the first information indicates that the first usage restriction is not to be imposed on the first area, determine that the first area is the unavailable state when the first information indicates that the first usage restriction is to be imposed on the first area and the data is the high-reliability data, determine that the second area is the available state when the second information indicates that the second usage restriction is not to be imposed on the second area, and determine that the second area is the unavailable state when the second information indicates that the second usage restriction is to be imposed on the second area and the data is the high-reliability data.

7. The nonvolatile memory device of claim 1, wherein when a write destination page specified by the controller corresponds to the word line of the lower layer side and the first information corresponding to a write destination block to which the write destination page belongs indicates that the first usage restriction is to be imposed, the control unit is configured to select an available write destination from the memory cell array, and write data to the available write destination, and when the write destination page corresponds to the word line of the upper layer side and the second information corresponding to the write destination block indicates that the second usage restriction is to be imposed, the control unit is configured to select an available write destination from the memory cell array, and write data to the available write destination.

8. The nonvolatile memory device of claim 7, wherein the control unit is configured to execute the switching control on either a write operation or the read operation or on both the write operation and the read operation.

9. A nonvolatile memory device, comprising:
a memory cell array comprising a plurality of erase unit areas each of which comprises a plurality of read unit areas;
a plurality of first storage units which correspond respectively to the erase unit areas and store a plurality of items of first information indicating whether a first usage restriction is to be imposed on the corresponding erase unit areas;
a plurality of second storage units which correspond respectively to the erase unit areas and store a plurality of items of second information indicating whether a second usage restriction is to be imposed on the corresponding erase unit areas; and
a control unit configured to execute switching control on whether the first usage restriction is to be imposed or not based on the first information and whether the second usage restriction is to be imposed or not based on the second information on the memory cell array, wherein
the memory cell array is a flash memory,
the erase unit areas are a plurality of blocks,
the read unit areas are a plurality of pages,
each of the plurality of blocks includes a plurality of memory cell transistors which are connected in series, a first select transistor connected in series to a first memory cell transistor among the plurality of memory cell transistors, a second select transistor connected in series to a second memory cell transistor among the plurality of memory cell transistors, a plurality of word lines connected to gates of the plurality of memory cell transistors, respectively, a first select gate line connected to a gate of the first select transistor, and a second select gate line connected to a gate of the second select transistor,
each of the plurality of word lines is connected to a third memory cell transistor and a fourth memory cell transistor,
the first usage restriction is to disable the third memory cell transistor included in the corresponding block,
the second usage restriction is to disable the fourth memory cell transistor included in the corresponding block,
when the first information corresponding to a read destination block to which a read destination page specified from a controller indicates that the first usage restriction is to be imposed, the control unit is configured to execute a read operation on the read destination page without using the third memory cell transistor connected to a word line corresponding to the read destination page,
when the second information corresponding to the read destination block indicates that the second usage restriction is to be imposed, the control unit is configured to execute the read operation on the read destination page without using the fourth memory cell transistor connected to the word line corresponding to the read destination page, and
when the first information corresponding to the read destination block indicates that the first usage restriction is to be imposed and the second information corresponding to the read destination block indicates that the second usage restriction is to be imposed, the control unit is configured to disable the third and fourth memory cell transistors connected to the plurality of word lines included in the read destination block.

10. The nonvolatile memory device of claim 9, further comprising a read only memory which stores the plurality of items of the first information corresponding respectively to the erase unit areas and stores the plurality of items of the second information corresponding respectively to the erase unit areas, wherein
the control unit is configured to store the items of the first information read from the read only memory in the corresponding first storage units and store the items of the second information read from read only memory in the corresponding second storage units at a time of activation.

11. The nonvolatile memory device of claim 9, wherein
when the first information corresponding to a write destination block to which a write destination page specified from the controller indicates that the first usage restriction is to be imposed, the control unit is configured to execute a write operation on the write destination page without using the third memory cell transistor connected to a word line corresponding to the write destination page,
when the second information corresponding to the write destination block indicates that the second usage restriction is to be imposed, the control unit is configured to execute the write operation on the write destination page without using the fourth memory cell transistor connected to a word line corresponding to the write destination page, and
when the first information corresponding to the write destination block indicates that the first usage restriction is to be imposed and the second information corresponding to the write destination block indicates that the second usage restriction is to be imposed, the control unit is configured to disable the third and fourth memory cell transistors connected to the plurality of word lines included in the write destination block.

12. The nonvolatile memory device of claim 11, wherein the control unit executes is configured to execute the switching control on either the write operation or the read operation or on both the write operation and the read operation.

* * * * *